US010686781B1

(12) United States Patent
Kaditz et al.

(10) Patent No.: US 10,686,781 B1
(45) Date of Patent: Jun. 16, 2020

(54) SYSTEM AND METHOD FOR PASSWORDLESS LOGINS

(71) Applicant: Affirm, San Francisco, CA (US)

(72) Inventors: Jeffrey Howard Kaditz, San Francisco, CA (US); Andrew Gettings Stevens, Palo Alto, CA (US); Bradley Neale Selby, San Francisco, CA (US); Aaron Ng Ligon, Palo Alto, CA (US); Manuel De Jesus Arias, San Francisco, CA (US)

(73) Assignee: Affirm Inc., San Francisco, AK (US)

( * ) Notice: Subject to any disclaimer, the term of this patent is extended or adjusted under 35 U.S.C. 154(b) by 0 days.

(21) Appl. No.: 14/578,353

(22) Filed: Dec. 20, 2014

Related U.S. Application Data

(60) Provisional application No. 61/920,475, filed on Dec. 24, 2013.

(51) Int. Cl.
*H04L 29/06* (2006.01)
*H04L 29/08* (2006.01)
*G06F 21/35* (2013.01)

(52) U.S. Cl.
CPC .......... *H04L 63/0853* (2013.01); *G06F 21/35* (2013.01); *H04L 63/08* (2013.01); *H04L 63/10* (2013.01); *H04L 67/10* (2013.01)

(58) Field of Classification Search
CPC ..... H04L 63/0853; H04L 63/08; H04L 63/10; H04L 67/10; G06F 21/35
See application file for complete search history.

(56) References Cited

U.S. PATENT DOCUMENTS

| 5,736,932 A | * | 4/1998 | Bulfer | H04W 12/08 340/5.74 |
| 6,871,287 B1 | * | 3/2005 | Ellingson | G06F 21/32 382/115 |
| 8,073,932 B2 | * | 12/2011 | Choi | G06Q 10/107 709/219 |
| 8,171,534 B2 | * | 5/2012 | Chan | H04L 9/3236 713/150 |
| 8,364,711 B2 | * | 1/2013 | Wilkins | G06Q 10/10 707/783 |
| 8,365,257 B1 | * | 1/2013 | Causey | G06F 21/645 713/156 |
| 8,528,068 B1 | * | 9/2013 | Weglein | H04L 63/0807 713/168 |

(Continued)

FOREIGN PATENT DOCUMENTS

WO    WO 2012/156785    * 11/2012    ............... H04L 9/00

OTHER PUBLICATIONS

NPL Search—Google Scholar (Year: 2020).*

*Primary Examiner* — Samson B Lemma
*Assistant Examiner* — Richard W Cruz-Franqui
(74) *Attorney, Agent, or Firm* — Staniford Tomita LLP

(57) ABSTRACT

A login system allows users to access computer systems without using a password. The passwordless system and method can use other information to securely and reliably identify true authorized system users. The identity of a user can be associated with their mobile device. The login can be based upon a minimal amount of information such as a name and a phone number which can be stored as an identification record for each of the users in a database.

25 Claims, 18 Drawing Sheets

(56) References Cited

U.S. PATENT DOCUMENTS

| | | | | |
|---|---|---|---|---|
| 8,584,225 B1* | 11/2013 | Kennedy | H04L 67/34 | 726/10 |
| 8,627,438 B1* | 1/2014 | Bhimanaik | H04L 63/10 | 726/9 |
| 8,646,060 B1* | 2/2014 | Ben Ayed | H04L 63/0853 | 726/9 |
| 8,649,768 B1* | 2/2014 | Gaddam | H04W 12/06 | 455/411 |
| 8,769,418 B2* | 7/2014 | Lee | H04L 51/14 | 715/752 |
| 8,769,784 B2* | 7/2014 | Ganesan | G06F 21/31 | 26/4 |
| 8,856,956 B2* | 10/2014 | Stibel | G06Q 10/107 | 726/28 |
| 9,002,018 B2* | 4/2015 | Wilkins | H04L 9/006 | 380/281 |
| 9,015,813 B2* | 4/2015 | Bicer | H04L 63/08 | 726/4 |
| 9,037,118 B2* | 5/2015 | Gaddam | H04W 12/06 | 455/411 |
| 9,047,259 B1* | 6/2015 | Ho | G06F 40/134 | |
| 9,077,714 B2* | 7/2015 | Neuman | H04L 63/045 | |
| 9,111,002 B2* | 8/2015 | Pronold | G05B 19/0423 | |
| 9,130,929 B2* | 9/2015 | Dorfman | H04L 63/0823 | |
| 9,183,362 B2* | 11/2015 | Thompson | G06F 21/31 | |
| 9,203,841 B2* | 12/2015 | Neuman | G06F 16/951 | |
| 9,823,918 B2* | 11/2017 | Aiglstorfer | G06F 8/65 | |
| 2001/0007099 A1* | 7/2001 | Rau | G06Q 30/02 | 705/26.8 |
| 2003/0061503 A1* | 3/2003 | Katz | H04L 29/06 | 726/4 |
| 2006/0143453 A1* | 6/2006 | Imamoto | H04L 9/3273 | 713/169 |
| 2007/0078734 A1* | 4/2007 | Oren | G06Q 20/401 | 705/26.1 |
| 2007/0277230 A1* | 11/2007 | Hawkins | H04L 63/08 | 726/4 |
| 2008/0040784 A1* | 2/2008 | Salva Calcagno | G06Q 20/02 | 726/9 |
| 2008/0229430 A1* | 9/2008 | Kargman | G06Q 30/0603 | 726/28 |
| 2009/0019003 A1* | 1/2009 | Bohannon | G06Q 30/02 | |
| 2009/0112719 A1* | 4/2009 | Bhave | G06Q 10/107 | 705/14.46 |
| 2009/0204468 A1* | 8/2009 | Waller | G06Q 10/107 | 705/7.18 |
| 2011/0131638 A1* | 6/2011 | Kan | G06F 21/43 | 726/6 |
| 2012/0143630 A1* | 6/2012 | Hertenstein | G06Q 40/08 | 705/4 |
| 2012/0204032 A1* | 8/2012 | Wilkins | H04L 9/006 | 713/170 |
| 2012/0227092 A1* | 9/2012 | Smith | G06F 21/42 | 726/4 |
| 2013/0191402 A1* | 7/2013 | Wilkins | G06Q 10/10 | 707/752 |
| 2013/0254650 A1* | 9/2013 | Huang | G06Q 30/0641 | 715/234 |
| 2013/0256403 A1* | 10/2013 | MacKinnon Keith | G06K 5/00 | 235/375 |
| 2013/0262857 A1* | 10/2013 | Neuman | H04L 9/083 | 713/155 |
| 2014/0082707 A1* | 3/2014 | Egan | H04L 63/0853 | 726/5 |
| 2014/0189808 A1* | 7/2014 | Mahaffey | H04L 63/083 | 726/4 |
| 2014/0279514 A1* | 9/2014 | Sharp | G06Q 20/40145 | 705/44 |
| 2015/0249540 A1* | 9/2015 | Khalil | H04L 63/0853 | 713/158 |
| 2015/0256530 A1* | 9/2015 | Semba | H04L 63/083 | 726/5 |
| 2015/0271177 A1* | 9/2015 | Mun | H04L 63/0876 | 726/7 |
| 2015/0348018 A1* | 12/2015 | Campos | G06Q 20/36 | 705/41 |
| 2015/0358154 A1* | 12/2015 | Garcia Morchon | H04L 9/0656 | 380/28 |
| 2015/0365792 A1* | 12/2015 | Manges | G06F 3/1454 | 455/457 |
| 2016/0071107 A1* | 3/2016 | Van | G06F 21/00 | 705/44 |
| 2017/0085563 A1* | 3/2017 | Royyuru | H04L 63/0861 | |
| 2017/0093860 A1* | 3/2017 | Hafernik | H04L 63/10 | |
| 2017/0230368 A1* | 8/2017 | Khan | H04L 63/18 | |
| 2017/0374065 A1* | 12/2017 | Shtraym | H04L 63/0861 | |
| 2018/0004934 A1* | 1/2018 | Venkataramani | G06F 21/46 | |

* cited by examiner

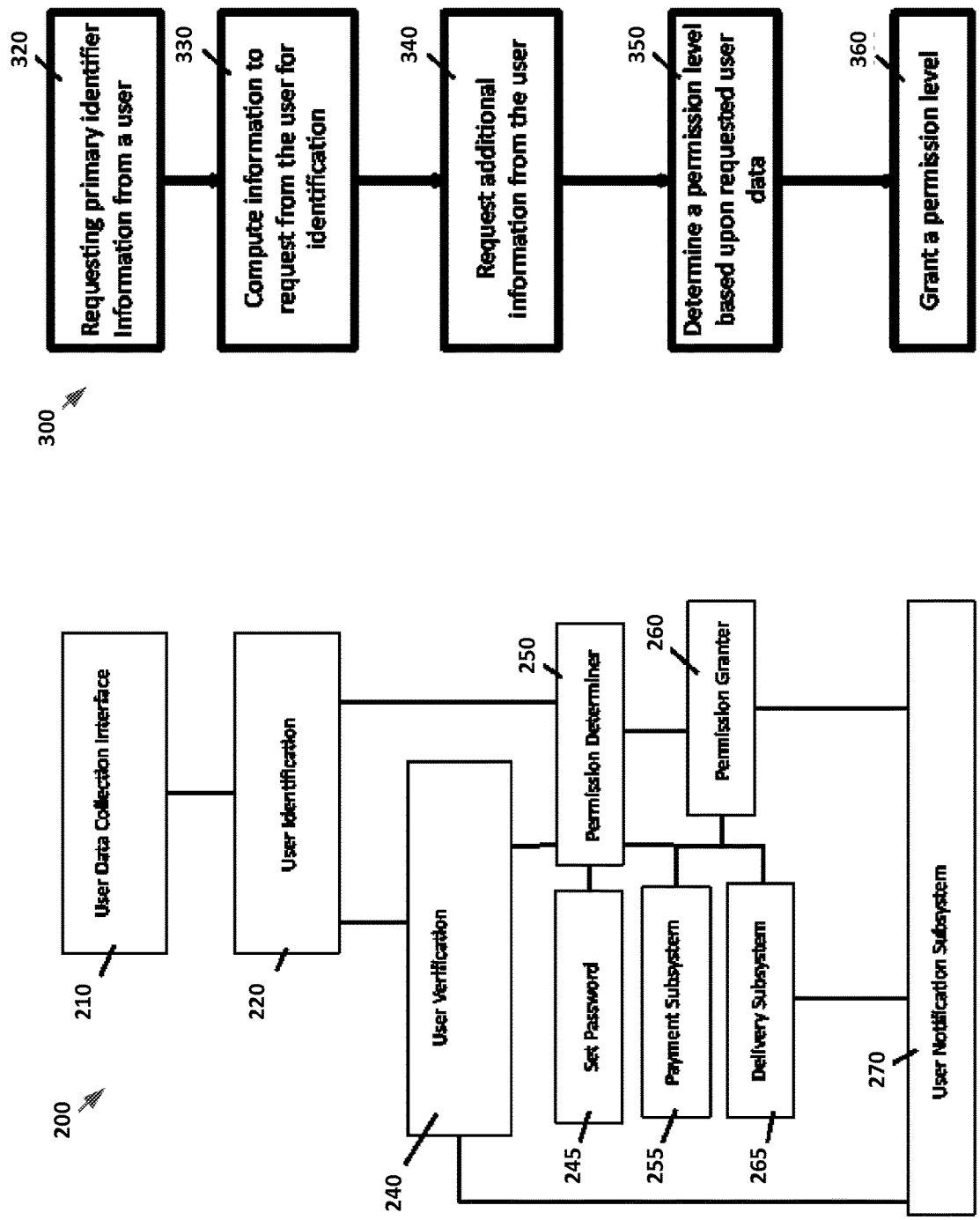

FIG. 13

Customer details — 507

Name

Phone Number — 509

Denim Jeans  $69.95
Size 4 Cayman 15% off

Total  $59.46

Cancel  Send

Jeans

Print Jeans  $59.95
Hot Jeans  $29.95
Cool Jeans  $55.96
Straight Jeans  $89.95

503 — $59.46

501

Finish — 505

101

SYSTEM AND METHOD FOR PASSWORDLESS LOGINS

CROSS-REFERENCE TO RELATED APPLICATION

This patent application claims priority to U.S. Provisional Patent Application No. 61/920,475, "System And Method For Passwordless Login" filed Dec. 24, 2013 which is hereby incorporated by reference in its entirety.

TECHNICAL FIELD

This invention relates generally to the computer interface field and more specifically to a new and useful system and method of identifying a user without a password.

BACKGROUND

Internet based systems typically require a user to login on a website to access and interact with information stored on a server. The login process typically requires a user to register with the system by providing personal information, create a user name and setting a password. Once a user has registered with the system, the user can login to the system by providing a username and a password. There are many problems with the username and password based login systems because users may have their passwords stolen and/or users may have many different passwords which are used for different websites and are commonly forgotten. What is needed is a system which can identify a user and provide a high level of security without the need for a password.

SUMMARY OF THE INVENTION

The present invention is directed towards a simplified and secure system for allowing people to register with computer systems without using a password and subsequently login with the computer systems without using a password. The problem with usernames and passwords is that they are easily forgotten and/or stolen. In contrast, the inventive passwordless system and method can use other information to provide better security and a more reliable method for identifying true authorized system users. An objective of the present invention is to associate the identity of a user with their mobile device, as mobile devices (particularly subscription mobile devices) are difficult to fake or spoof. Another objective of the present invention is to provide a highly secure login system for accurately identifying a person based upon a minimal amount of information. For example, in an embodiment, the login and/or registration may only require a user to provide his or her name and a phone number which is input through a user interface and transmitted (perhaps along with other latent information in the mobile device, such as previous website cookies or mobile device identifiers) to the system server. The system server can create and store identification records for the user in a database.

The system can then send a message directly to the user's smart phone using the phone number, to confirm that the user is in fact the owner of that smart phone and that the user is in possession of that smart phone (e.g. closing the loop between the user and the device—resolving the identity of the user to include the phone number or mobile device ID). While not infallible, this provides a pretty good layer of security for linking the user to their device. When the system server receives the verification message from the user's smart phone, the system can also receive additional information about the mobile device that is owned by the user such as: a mobile device fingerprint, a mobile device serial number, International Mobile Station Equipment Identity (IMEI), an AppSignature or any other suitable identification information. This phone information can be used to authenticate the user. In some cases the phone number may be an indicator of possible fraud. For example, a phone number for a pre-paid phone can be detected by the inventive system and may be considered to be an unacceptable fraud risk that can preclude the user from access to the system services.

Based upon the information that is received, the server may be able to verify that user is a true person who can be an authorized user of the system. In different embodiments, the server can perform various steps to make these determinations. The server may check phone number databases to determine if the phone number matches the name. Using the name and phone number, the system can obtain additional information about the user. For example, the system can use this information to find a user's address(es), e-mail address (es), social network activity, etc. Information indicating higher amounts of activity will increase the likelihood that the user is a real person who can be an authorized user of the server system. The more "normal" information that is associated with the user that the server finds, the higher the probability that the user is a real person who can be authorized to use the system.

In some situations, the server will not be able to determine that the user is a real person or an authorized user from the name and phone number provided by the user. If the server cannot verify that the user input data is for a real person, then the server can request additional information from the user. This need for more information can occur (without fraud) when the user is using a new device that has never registered before, new phone number, new email, entirely new user, new email address, government ID number, etc. In an embodiment, the server may ask the user for additional information that can be used by the server to verify a user as a real person rather than a bot or fraudulent user. Information can include: identity platform logins for GMAIL, FACEBOOK, YAHOO, MICROSOFT, HOTMAIL or any other known source for user IDs. The system server can use these logins to verify the user's account and information with these services.

Many people have multiple smart phones or mobile devices having internet browsers. In an embodiment, information such as shared email addresses and phone numbers can be used across accounts to link accounts to existing user identities and mobile devices to ensure that the current activity/login attempt is associated with the correct user, and enabling them to have a current account status/balance properly reflected. The linking of device, user and transaction information can prevent a user from paying off their account with a first device and having the account balance not associate with the account they have used previously and are expecting to be paying off. Linking the information from multiple mobile devices used by a single user or single entity can help to keep track of financial transactions.

After a user has been authenticated (e.g. the name, phone number and other information is consistent), the user's mobile device can be verified by the user. The verification is important because it provides a safeguard when a mobile device is transferred to a new user. For example, these safeguards are useful when a user sells, returns or transfers a mobile device that he or she has previously used. Although the mobile device such as a smart phone is associated with the original user (seller), the new user (buyer) cannot make purchases using the sold mobile device using the seller's ID/internal mobile device fingerprint and/or seller identification that associated with that device. The end user's mobile device may include system for verifying a user's finger print. In some embodiments of the present invention, the system may require a fingerprint verification to confirm that the proper device user is performing the transaction.

As discussed, the server can associate the user with the phone number of the mobile device as well as other mobile device identification information. If the mobile device is sold, lost, stolen or transferred to another user, the new user will not be able to use the original user's identity to interact with the system server. If the new user attempts to use the original user's identity, the system will detect the mobile device transfer and prevent unauthorized use of the original user's identity. The new user may input the original user's name and phone number. However, when the text, SMS or email message with the link is sent to the phone number associated with the new original user (seller), the new user (device buyer) won't receive the text, SMS or email because the phone number and/or email address of the original user should have been removed from the mobile device. When the mobile device is sold, lost, stolen or transferred, the mobile device will be given a different phone number or email address or APPLE ID/LINE ID/SKYPE ID. Thus, the user identity verification step will fail.

In other embodiments, the identification can also be a push notification to an App that may or may not be perceived by the user (e.g. a silent push notification). For example, the identification can be a simple security question like "last 4 of your social", a secret question, a simpler question like "what color is your hair?" or "which address did you live at last year?" Any other suitable security questions can be used by the inventive system.

If the user is identified as malicious or associated with a malicious user identity, then the system can transfer the malicious user to a "honey pot" to gather information from these "bad" users. The system server may ask for additional information about other accounts that also may have been compromised by the malicious user and may now associated with the malicious user's ID including: phone numbers, emails, bank accounts, government IDs, names, addresses, device fingerprints, network addresses, etc. This verification can be particularly important if the malicious user has passed through the authentication analysis. In contrast, if the authentication and the verification failed, this might indicate a used phone was acquired from a good user.

The inventive system can be used by any system that requires authorized user logins and provides substantial benefits because the users do not need to remember user names and passwords. However, in an embodiment, the system can be setup with an optional password for users wishing for additional security or a more traditional interface. The primary mechanism for insuring accurate authorization is the use of SMS messages that include the verification information or hyperlink. The combination of the user identification with the corresponding mobile smart phone information provides a strong indication or a high likelihood that the user is the true authorized system user.

BRIEF DESCRIPTION OF THE DRAWINGS

FIG. 2 is a diagram that illustrates an embodiment of a system that can identify a user without a password;

FIG. 3 is a basic flowchart of a method of identifying users without a password;

FIGS. 6-16 illustrate an embodiment of a user interface of a personal point of sale program running on a merchant computing device;

DETAILED DESCRIPTION

The following description of the preferred embodiments of the invention is not intended to limit the invention to these preferred embodiments but rather to enable any person skilled in the art to make and use this invention. The passwordless login is designed to simplify the user registration process by removing the password step, and/or the passwordless login can be used to confirm that the user is in fact the owner of that smart phone and that the user is in possession of that smart phone (e.g. closing the loop between the user and the device—resolving the identity of the user to include the phone number or mobile device ID). Another way of describing the inventive passwordless login system is a probabilistic login. All, username/password combinations are probabilistic. There is a high probability that someone who can provide the proper username and password combination is the true registered user. However, there is also a possibility that someone else can use the credentials if the passwords are stolen. The inventive passwordless login may provide a better probabilistic login with a higher probability of being real (e.g. not easily faked) by asking a user for a minimum amount of information.

Figure 1:
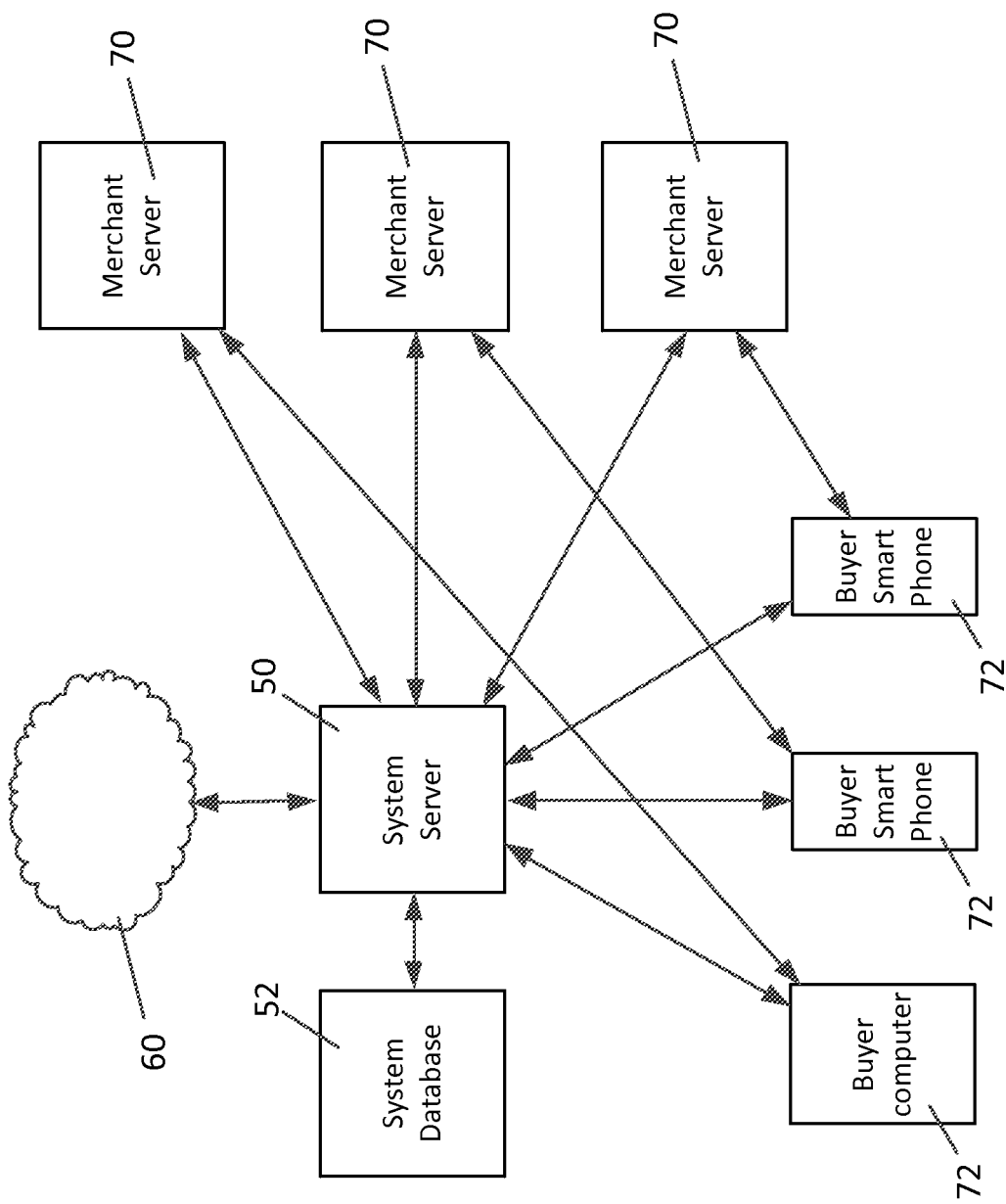
FIG. 1 illustrates a block diagram of an embodiment of the passwordless login system.

With reference to FIG. 1, in an embodiment, the inventive system can include a system server 50, which is used with a plurality of mobile devices 72. The system server 50 may work with other merchant and service provider servers 70 to process communications from the mobile devices 72. For example, in an embodiment, the system server 50 can provide a "white-label" for other merchant servers 70. The system server 50 may have a database for storing information about the users and the mobile devices 72. The system server 50 can also communicate with other databases to obtain information and verify information about the mobile devices 72 and the users of the mobile devices 72.

With reference to FIG. 2, an embodiment of a system 200 is illustrated for identifying users without requiring the user to enter a password. The system 200 can include a plurality of software modules are used to perform each function of the system. These software modules can comprise: a user data collection interface 210, a user identification 220 component, a user verification 240 component, a permission determiner 250, and a permission granter 260. An alternative embodiment can include a payment subsystem 255, a delivery subsystem 265, and a user notification subsystem 270. A further alternative embodiment can also include a password 245 module.

The user data collection interface 210 can function to collect data from an entity, user, person, company, organization, group of people, or device. The data can be input by a user, such as a phone number or email address, or can be collected automatically about the user, such as capturing a user's phone number from a caller ID signal, taking a photograph from a user. The user data collection interface 210 can also do unit testing or input verification testing on the user input, for example making sure there are enough digits in a phone number entered by a user, or verifying that an email contains an @ symbol. The user data collection interface can be a form on a website, a mobile app on a mobile device such as a smartphone, tablet, smart watch, mobile computer, client computer, etc. In one embodiment where the user data collection interface 210 is a mobile app on a mobile device, a unique identifier of the mobile device (such as an IMEI number, a phone number, a device serial number, SIM card ID, a digital fingerprint, or other suitable identifier that can uniquely identify a user device) can be collected by the mobile app such that user data is collected, without necessarily requiring input from a user.

The user identification 220 module functions to determine if a user is identified, and/or begin a registration process for new users who cannot be identified with the information received from the user data collection interface 210. If a user or entity cannot be identified, the user identification 220 module can utilize a user verification 240 module to register a user and/or store the data such that a user identification 220 module can identify the user in the future.

User verification 240 module can also function to register a completely new user or identity. A completely new registration can use information such as: existing identity platforms, such as FACEBOOK, GMAIL, YAHOO Mail, a custom registration page for a company or shopping cart, a subscription service, a mailing address, an account number, a credit card number, a bank account number, a government ID number such as a social security number or any other suitable identification. This information can be associated with a new user identity.

In one variation, when a user is authenticated by a user verification 240 module, data that is shared between a newly registered entity and a previously registered entity can be strongly indicative of the identities being related to the same entity, person or user, and in this variation, the user can be identified and associated with a user account, or other historical information relating to their use of the permission system. In another embodiment, if a user can be identified by the user identification 220 module, using data collected by the user data collection interface 210, the user identification device 220 can associate other information with the identified user.

For example, if a user phone number was collected by the user data collection interface 210, and the number may be associated with the user and recognized by the system. However, a user may have changed their phone or mobile device since the last time the user identification 220 module received the user's phone number as an input, the user can be identified by their phone number, but also a unique identifier for their mobile device can now be associated with that identity, in case the phone number changes.

In another example, if a user phone number was collected by the user data collection interface 210, the user identification 220 module may not recognize the number. However, if the user data collection interface 210 also collects a unique device identifier, and can recognize the device associated with an identity, and the user identification device 220 can associate a new number with the same identity. In this example, a user verification device 240 can also verify that it is the same identity using an additional factor of authentication, such as a password, an email, an SMS message, a URL link to a website, an RSA token code generator, or any other form of two factor authentication method. This two factor process can be helpful in a situation where a user or identity has lost or sold a mobile device. While the mobile device is recognized by the user identification 220 module, the user verification 240 module can attempt to verify the identity of the new phone number that can be associated with a mobile device, and if the verification fails, the mobile device unique identifier can be disassociated from a user identity until the mobile device identifier can be associated with a verifiable user identity.

In yet another example, a user data collection interface 210 can collect information about the user's mobile device such as: a unique identifier for the mobile device and the mobile device phone number, etc. Using this information the user identification device 220 can identify a unique user that can be verified and authenticated, possibly with a high degree of statistical success. If the system determines that the user identity has a very high probability of being accurate, in an embodiment, the user verification 240 module can be bypassed.

The permission-determiner 250 module can function to determine permissions for a user or identity or entity that has been identified, registered or otherwise authenticated. These permissions can vary depending upon the type of function of the internet based service. For example, in one variation, the permission determined can be a credit score which can correspond to the terms of financial credit that the system can offer the user. In another embodiment the permission determined by the permission-determining device 250 can be a credit limit which limited the total amount of financial credit that the system can offer the user. In yet another embodiment, the permission can grant access to a "honey pot" used to collect additional information about malicious users. These are only simple examples of the permissions that can be associated with a user by the permission determiner 250 module. In other embodiments, the permission determiner 250 can accept any number and types of data inputs associated with the user. The permissions granted to each user can be different and each permission can include access or denial of access to information and/or services, read only permissions and read/write permissions, credit, credit scoring, quality of service, level of service, speed of service, frequency of service, cost of a product or service, access to a honeypot which can be a special permission which can be reserved for security testers and malicious users, etc.

The permission granting 260 module can function to grant permissions determined by the permission determining device 250. In one embodiment, the permission granted is credit to buy a good or a service, and the permission granting device can extend credit and/or process payments from a payment subsystem, as well as schedule a service, or coordinate shipping of a good, or provide access to a digitally delivered good (such as a URL link in an email or an SMS message).

When the inventive system 200 is used with a merchant service, the system 200 may have to process payments by the users. The payment subsystem 255 can function to process payments, and payments can be made using a credit card, a gift card, a bank account using AUTOMATED CLEARING HOUSE (ACH) transactions, bank wires, a money transfer service such as PAYPAL or WESTERN UNION, or payments can be debited against a credit limit granted by the permission granting device 260. The payment subsystem 255 can also be used to process refunds.

The delivery subsystem 265 can function to facilitate delivery of goods purchased from the merchant. The delivery subsystem 265 may also be used scheduling of a purchased service and/or locating of an available rental asset to deliver the purchased goods. The delivery subsystem 265 can collect additional information from a user such as scheduling times, shipping addresses, billing addresses, gift wrapping information, delivery preferences, shipping speed preferences, electronic delivery preferences, or any other information.

The user notification subsystem 270 can function to notify a user of permissions that have been granted, and can also function to welcome newly registered users, and/or encourage newly registered users to provide additional information that can be useful for past, present or future permission determinations.

Although the inventive system can be configured to not require a password, in other embodiments, it is possible to include a password feature. The set password device 245 can function to set passwords or other authentication factors such as security questions, two factor authentication keys, tokens or other information for accounts. The set password device 245 can be used by users who require additional security for their own comfort, or for entities which require additional security (e.g. businesses with high risk of fraud), national security organizations, or any other identities or entities that may prefer or require additional or alternative security measures for identities and accounts. The set password device 245 is an optional element in the system 200.

The basic process for implementing the inventive system can be described with reference to FIG. 3. In this example, the inventive system is used with a merchant website for the purchase or a financial transaction. The method 300 can be initiated during, before or after a checkout process or an account payment for a user, access to a service, information or any other suitable permission activity. The checkout process or account payment can be to purchase a product, service, gift or make a payment to an entity, such as another user, organization or business, as specified by a user. In an embodiment, this checkout process can be initiated from a mobile device, desktop computer, laptop computer, tablet, or mobile website store. It also can be initiated from a social network, catalog site, or other online property. This checkout process can also be initiated offline from a point of sale terminal or other method of initiating a checkout sequence.

As shown in FIG. 3, an embodiment of a method 300 for identifying users without a password includes the steps of requesting primary identifier information from a user 320, computing information to request from a user for identification 330, requesting additional information from the user 340, determine a permission level based upon requested user data 350, and grant a permission level 360.

Step 320 can include requesting primary identifier information from a user, functions to request information that can be used to identify a user, and the requested information can be a unique identifier such as a phone number, email address, social security number, username, passport number, device identifier of a mobile device, such as an IMEI, device serial number, customized software application signature (such as a signed App store download), registration key or any suitable device fingerprint. The primary identifier information can be chosen as an identifier that can be unique to a user, and can identify if a user is new or has used the checkout process before.

Step 330 can include computing information to request from a user for identification, functions to compute additional information that can be used to identify a user. If a user can be identified, information about that user can be automatically associated with the transaction, including user preferences, shipping addresses, payment tax rates, loyalty programs or any other suitable information. If a user cannot be identified, then the user can be prompted to sign in to an existing account, or the user can be prompted to enter information sign up or register for the service. If a user cannot be identified, Step 330 can also include transmitting an Internet hyperlink, a passcode or biometric to a user authenticated device, such as a mobile device, a smartphone, a tablet computer, or a laptop or desktop computer.

Step 340 can include requesting additional information from the user, functions to request the additional information from the user. This information can be requested through a web interface form, clicking on an Internet hyperlink to verify receipt, a text message, SMS message, a phone call, a physical mailing sent through a postal service, an email, a personal visit, data from a physical sensor, such as a finger print sensor, or any other suitable method. In one embodiment the information requested, can be a postal code/zip code, name, and/or email. In an alternative embodiment, the information requested can be completely new registration information to be entered into forms or databases manually by a user, automatically by a program, such as a browser script, or the information requested can be captured using login information from existing identity platforms, such as Facebook, Gmail, Yahoo! Mail, or any other similar service. In a further embodiment, the information can include a shipping address. The shipping address can be automatically completed using a database of possible addresses. The shipping address can be automatically completed (either partially or fully) after a first character of the address, and/or the first few characters of the address are entered by the user.

Step 350 can include determining a permission level based on requested user data, functions to process the additional information collected from a user, and use the information to classify a user for access, permission, credit and/or authorization. In one embodiment, the permission granted is credit to buy a good or a service, and the permission granting device can extend credit and/or process payments from a payment subsystem, as well as schedule a service, or coordinate shipping of a good, or provide access to a digitally delivered good such as a URL link in an email or an SMS message.

This information can result in the identification of a user, and if a user can be identified, and is determined to be a legitimate user, as opposed to a malicious or fraudulent user, step 350 can grant access, complete a transaction, ship a product, or step 350 can authenticate a user and provide a user with additional options, such as an order confirmation, special shipping instructions, size, color, flavor, materials and other parameter selections, dates and/or times of a service to be performed, or the like. In the case where a user has previously been identified, information about that user can automatically be associated with the transaction, including user preferences, additional device fingerprints, additional device verifications, shipping addresses, payment tax rates, loyalty programs or any other suitable information. Additionally, a merchant or service provider can receive information about the user for their own analysis. At the final step 360, the system grants users permissions which functions to provide access, permission, credit and/or authorization to a user. The types of permissions can vary depending upon the types of internet-based system that the passwordless login is being used with.

Figure 4:
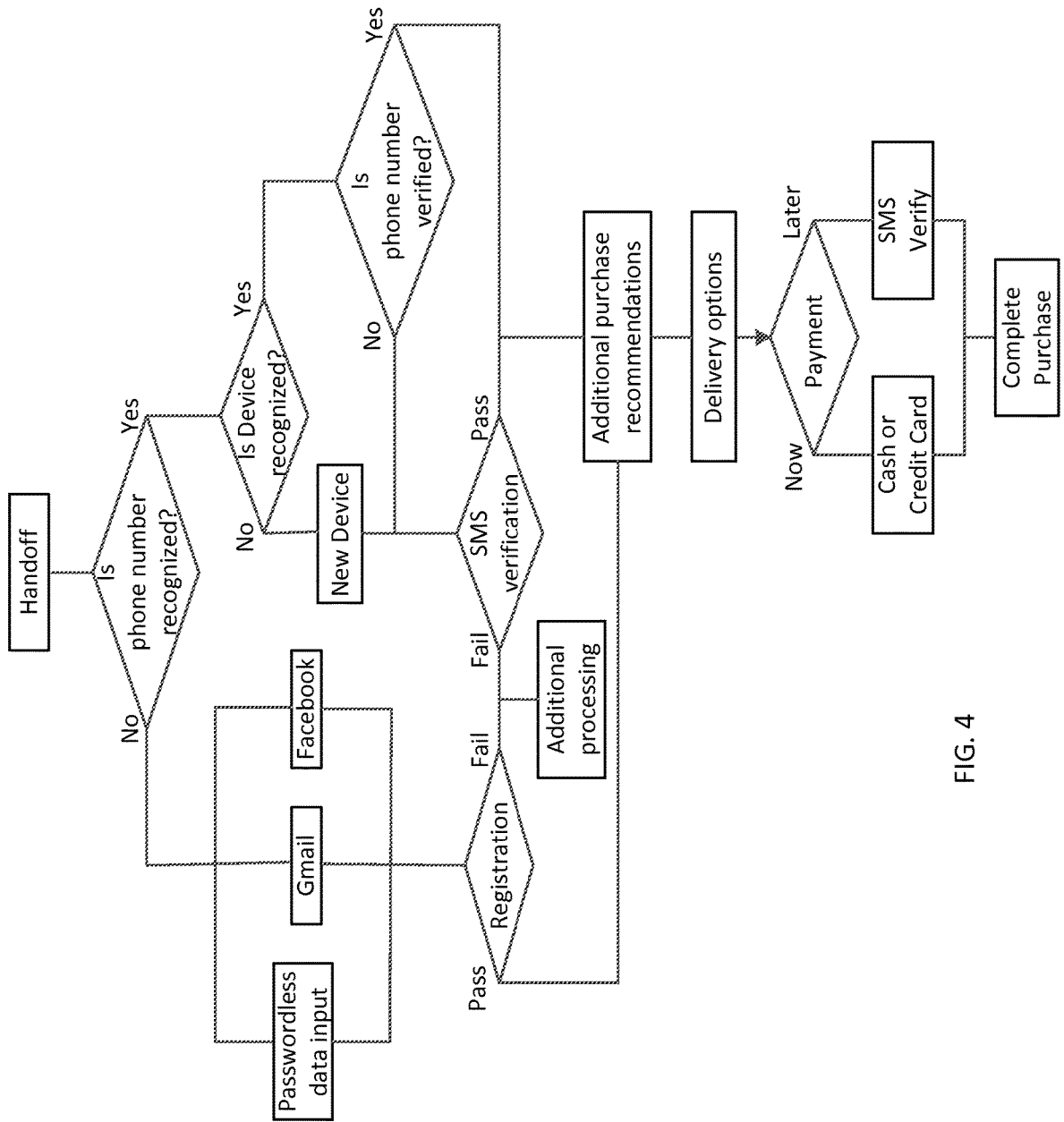
FIG. 4 illustrates a flow chart of an embodiment of the passwordless login system.

With reference to FIG. 4, a more detailed embodiment of the inventive process is illustrated. In this example, the inventive system is used to make a purchase from an on-line merchant. The inventive system can function as a "white label" system for the on-line merchant. The customer can select a number of goods or services for purchase and then proceed to a registration and check out systems that are provided by the inventive system. This transfer of the customer from the on-line merchant can be a "handoff" 401. The inventive system can transmit a request asking for a name and/or a mobile device phone number of the customer. The system can then determine if the phone number is recognized 403 by looking for a matching phone number stored in a registered user database. A recognized phone number can indicate that the user may already be registered and an unrecognized phone number can indicate that the user is not registered with the inventive system.

If the phone number is not recognized, the system can proceed to ask the user to register with the system. The system may provide the user with several registration method options including: manual registration or automated registration (e.g. where registration data can be populated from data from a Facebook, Gmail, LinkedIn or other online account) through existing on-line user activities. The user can select the desired registration process and the inventive system will proceed with the selected registration process.

The manual registration process of the inventive system can be variable depending upon the amount of information that can be found by the system for the user. If the user has a smartphone number that matches the user's name, this may be sufficient to complete the registration. From the name and phone number, the system may be able to obtain additional publically available information such as: home address, social network activity, e-mail address, employer, financial information, etc. Based upon the submitted and collected information, the name and phone number may be sufficient to complete a new user registration.

However, if the phone number is for a prepaid phone this may indicate that more information is needed from the user to complete the registration. This additional information can include: personal, on-line and financial information. The inventive system may be able to use the provided information to verify certain facts about the user which may be sufficient to complete the registration, with the idea being that additional information can improve the likelihood that a user is who they say they are.

If the user is also an active e-mail user or social network user the system can use the e-mail or social network logins to register new system users. For example, in an embodiment a user may input email information 407 or social network information 409 to complete the registration process. Examples of e-mail logins can include: Gmail, Yahoo mail, etc. Examples of social network logins can include: Facebook, LinkedIn, etc. Once the system collects the necessary information to complete the registration, the system server can determine if the user registration has passed or failed the registration requirements 411.

If the registration fails, the system can perform additional processing to attempt to complete the registration 413. For example, if identification information provided by the user cannot be verified, the system may request credit card information from the user. The verification of the credit information can be sufficient to complete the registration. In other embodiments, other additional processing can be performed to complete the registration.

If the registration passes, the system server can transmit a welcome email or a SMS message to the user through the phone number provided by the user. In an embodiment, the welcome message may include a hyperlink and a unique randomly generated "verification code." The user can click on the hyperlink or alternatively enter the code into a website on the mobile device/smart phone itself or another device, such as a computer, which may cause the computer or smart phone to display a browser page with a button that is clicked to complete the registration. When the user clicks on the registration button, identification information about the computer or smart phone device currently being used can be transmitted back to the system server along with the verification code. This identification information for the device can be associated with the user by the system server. This association between the user and the device identification information can be known as "binding" the device to the user (e.g. closing the loop). For future interactions, the system can check to see if the device is recognized by the identification information 421. A mismatch of identification information can indicate that the user is operating a new device 423 and the system can repeat the described process to bind the new device to the user data. Alternatively, an identification information mismatch can indicate that a user has changed their number or sold a device on the second hand market to a different user. If a mismatch of identification information is detected, the system can repeat the described process to bind the device to the user data.

The verification code can be a good means for providing system security. The return of the verification code can be evidence that the registration is proper and is being used by a real user. In contrast, if the verification code is not correct, this can be evidence that a malicious user is attempting to register with the system.

In an embodiment, the verification code can be a randomly generated alphanumeric string that can be a length that provides a high level of security. Longer character strings can provide additional security because it can be difficult to fraudulently reproduce longer random codes. In an embodiment, the verification code can be at least 5 characters long. However, in the illustrated example, the verification code is 10 characters long. The verification code can include at least one upper case letter and one lower case letter. In other embodiments, the verification code may also include symbols. In still other embodiments, verification codes can be non-character non-symbol elements, such as colors, images, sequences of images, audio sounds, or biometric data.

In an embodiment, the system may only allow the user a limited amount of time to click on the link in the SMS message and complete the registration process. In an embodiment, the response time can be about 3-10 minutes. However, in other embodiments, the response time period can be adjusted according to allow enough time for easy user registration but short enough to prevent most possible fraudulent activity, which can be up to about 15 minutes. After the response time has expired, the system may cancel or perform additional checks on the user before completing the registration. For example, if the response time has expired, the system may respond by transmitting another SMS message with a second hyperlink and a second verification code with the same or a shorter allowed response time. This limited response time can be an important means for preventing possible fraud. In a normal registration process, the user will be with the mobile device and will be able to click on the link by simply clicking on a displayed link. This action should only take a few seconds. However, to avoid situations where there are normal delays, the system can allow a response within a few minutes. If this reasonable time period expires, the system may simply perform additional checks before completing the registration. If the additional checks indicate possible fraudulent activity, the system can cancel the registration.

Once the user has completed the registration process, the system can transmit a welcome SMS message to the user's phone number. The described registration SMS message with the hyperlink and verification code can be appropriate where the transaction has been cancelled before the check out process is completed.

In other embodiments, the system may recognize that the user is attempting to purchase goods and the registration can be performed during the purchasing process. Thus, the described email or SMS message with hyperlink and verification code can be transmitted to the new user during the check out process.

Once the user registration is complete, the system can continue to process the user's purchase and provide the user with various purchase options such as in store pick up, shipping options, delivery addresses, gift wrapping, etc. The system can then provide the buyer with payment options. If the buyer decides to make the payment immediately, the system can ask the user for payment information such as credit card, debit card, PAYPAL or other payment methods.

If the user decides to pay later, the system can immediately send the buyer a SMS message that includes a hyperlink and a unique randomly generated verification code. The user can click on the hyperlink that may cause the computer or smart phone to display a web page for the purchase that includes information including a description of the item or service being purchased, total cost and buttons to complete or cancel the purchase. Because the unique verification code is part of the hyperlink, the proper web page will immediately be displayed for the user to complete the purchase without any additional searching.

In one embodiment, the user can verify after they have completed their purchase. Instead of receiving the text message in the registration process, the user would be allowed to temporarily register conditional on their verifying the device soon after the purchase is complete. This would be accomplished by sending the buyer a SMS message that can include a hyperlink or a unique randomly generated verification code or a request for a response through SMS (e.g. "Please respond 'Y' to confirm this purchase.")

In an embodiment using a hyperlink, the hyperlink can be used to provide a verified connection between the cookie on the user's device to the phone number the user has provided. This can work by sending the hyperlink in a text message to the phone number the user has provided. The user can click on this hyperlink which can direct them to an Affirm domain that can check the cookie on their device and can associate it with the phone number. Once they user clicks the link, Affirm can verify that the device with the phone number the user provided is the same device as identified by the cookie.

Additional methods to verify a user instead of using a hyperlink transmitted via SMS can include placing a phone call to a user smartphone device that tells a user a code to enter on a website. A landline may also be possible. Alternatively, a user can verbally respond to the call with a code displayed on a website or other verification information, such as an order number, a secret question and answer, an identification number, a vocal pitch or a musical note, or any other suitable audio response.

The hyperlink could be replaced with a captcha image, sent as an mms message to a user smartphone or mobile device, wherein the captcha can include alphanumeric or symbolic codes or other information enter on a website for verification purposes, an MMS message that can contain a barcode or a QR code to scan at a point of sale (POS) terminal for device/user pairing authentication purposes.

An alternative method can be a push notification, pushed to a user's phone, such that the user can respond to the push notification through clicking on a button in an app, responding via voice recognition prompt in an app, or any other suitable smartphone app or mobile device app, or computing application. In one embodiment, the push notifications can serve to notify a user of a verification that has transpired, but the verification itself will be automatically transmitted by the app.

In an embodiment, the system may only allow the user a limited amount of time to click on the link in the SMS message and complete the purchase. In an embodiment, the response time can be about 3-15 minutes. After the response time has expired, the system may cancel or perform additional checks on the user before completing the purchase. For example, if the response time has expired, the system may respond by transmitting another SMS message with a second hyperlink and a second verification code with the same or a shorter allowed response time.

When the user clicks on the purchase button, identification information about the computer or smart phone can transmitted back to the system server. This identification information can be associated with the user or checked by the system to confirm that the computer or smart phone is associated with the buyer. If all information is proper, the system will complete the transaction and send the user a purchase confirmation email or SMS message with a hyperlink to a full electronic purchase receipt page.

If there is a mismatch or a discrepancy in the user and device information, the system can perform additional processing in an attempt to correct or identify the error or stop a fraudulent transaction from occurring. If a malicious user or fraudulent activity is detected, the system can stop the purchase and attempt to collect more information from the malicious user.

As discussed above, after the handoff the phone number provided by the user may be recognized. If the phone number is recognized, the system can then determine if the device is recognized and already associated with the user. The system can compare the device identification information to the user information stored in a system database. If the phone number is recognized but the device identification information is not recognized, this may indicate that the user has purchased a new device. Conversely, if the device identification information is recognized, but the phone number is not recognized, it may be possible that the user has sold their mobile device, or that the user changed mobile device carriers, and in either case—verification would be a good idea. As discussed above, the system verification can include sending an SMS message to the phone number with a hyperlink. In one embodiment, clicking on the link can cause the device to display a page that sets a cookie on the user's device therefore binding the new device to the user's identity. In another embodiment, the page can include a button to be clicked by a user.

If the device and phone number are both recognized, the system may then check to determine if the phone number has been verified. In some cases, the system may know the user, phone number and device identification but the phone number verification was not performed during prior registration and/or binding attempts. The system can transmit an email or SMS message to the phone number with a hyperlink. Clicking on the hyperlink can cause the device to display a phone number verification button. Clicking the button can cause the system to transmit a verification message back to the system server. Once the user has passed the SMS verification, the system can give the user the same purchase, shipping and payment options described above.

Any embodiment of the present invention where the user verification is used to authenticate a payment method for completing a purchase can be a substantial improvement over credit card transactions because the user only has to click on large hyperlinks and confirmation buttons to complete the purchase. The user does not have to enter: a credit card number, expiration date and security code information which can be extremely difficult to do on a mobile device such as a smart phone which has a small touch screen keyboard. The inventive process is substantially more secure than credit cards as well because a person is more likely to have credit card information lost or stolen than losing a smart phone. If a phone is lost or stolen, the user can frequently remotely disable the phone and transfer the same phone number to a new or different smart phone. As described above, the inventive system can then quickly and easily be used to bind and associate the user with the new smart phone. In contrast, if a credit card is lost or stolen, it can take the user some time to even know that the card is missing or that the information has been stolen. The user must cancel the credit card and all services that use the credit card for recurring charges.

Figure 5:
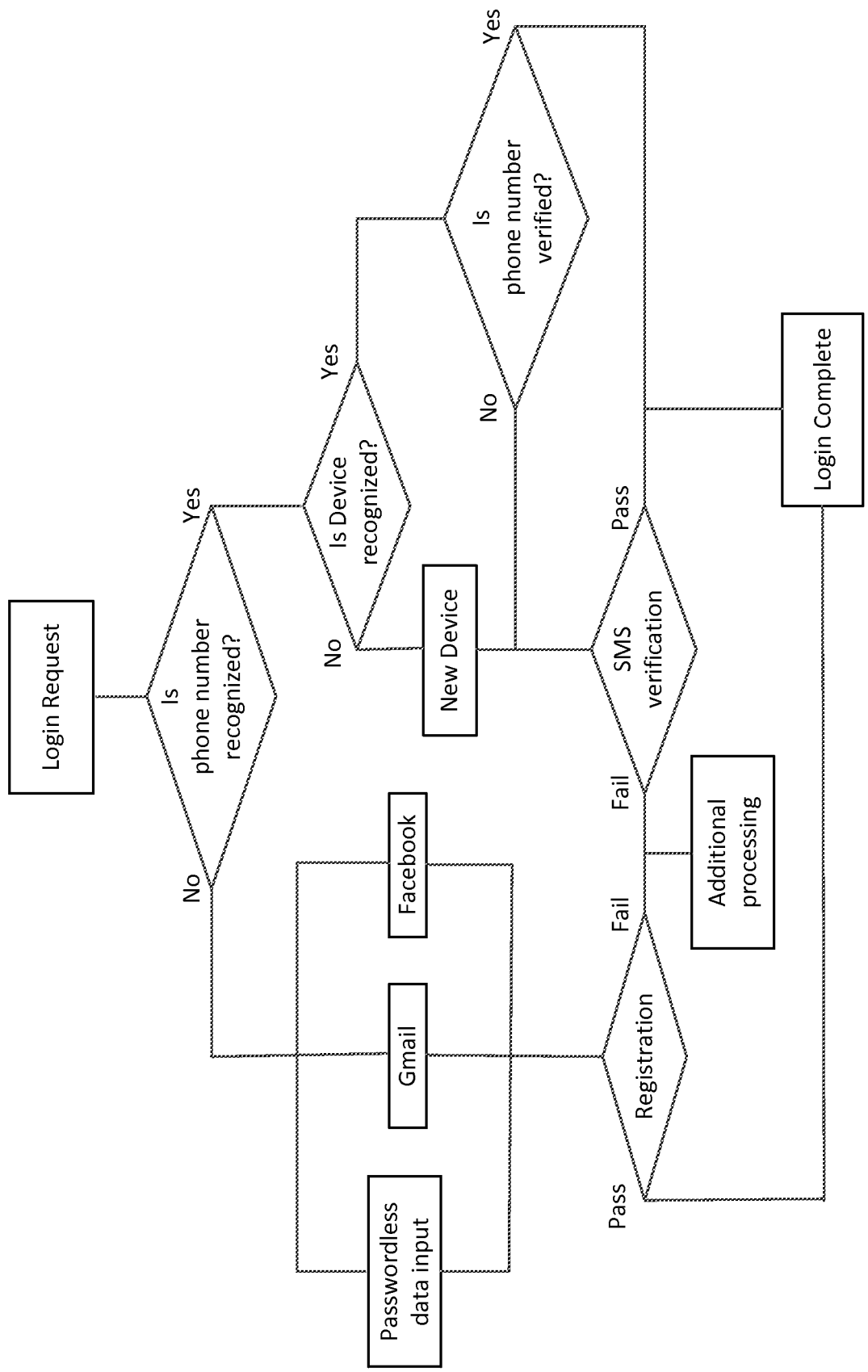
FIG. 5 illustrates a flow chart describing an embodiment of a passwordless login system method.

In other embodiments, the inventive system can be used for various other types of permissions and/or authorizations. Many internet based systems allow users to access their website by login process that includes inputting a user name and a password in order to interact with the website and obtain information. Many websites provide similar user interaction through mobile application programs with a similar user name and password. With reference to FIG. 5, in an embodiment, the inventive system can provide an alternative means for system logins. FIG. 5 is very similar to FIG. 4. However, rather than a "handoff" these embodiments include a "Login Request." Rather than typing a user name and password, the user would type in a phone number which is unlikely to be forgotten and can be obtained from the smartphone. The system would determine if the phone number is recognized and perform the same process steps described above with reference to FIG. 4. When the user authentication and device verification steps have been completed, the system can complete the user login. The login with a phone number and mobile device information as described above is a simpler and more secure method of login than a user name and password which can be stolen or used by anyone with this information.

Figure 7:
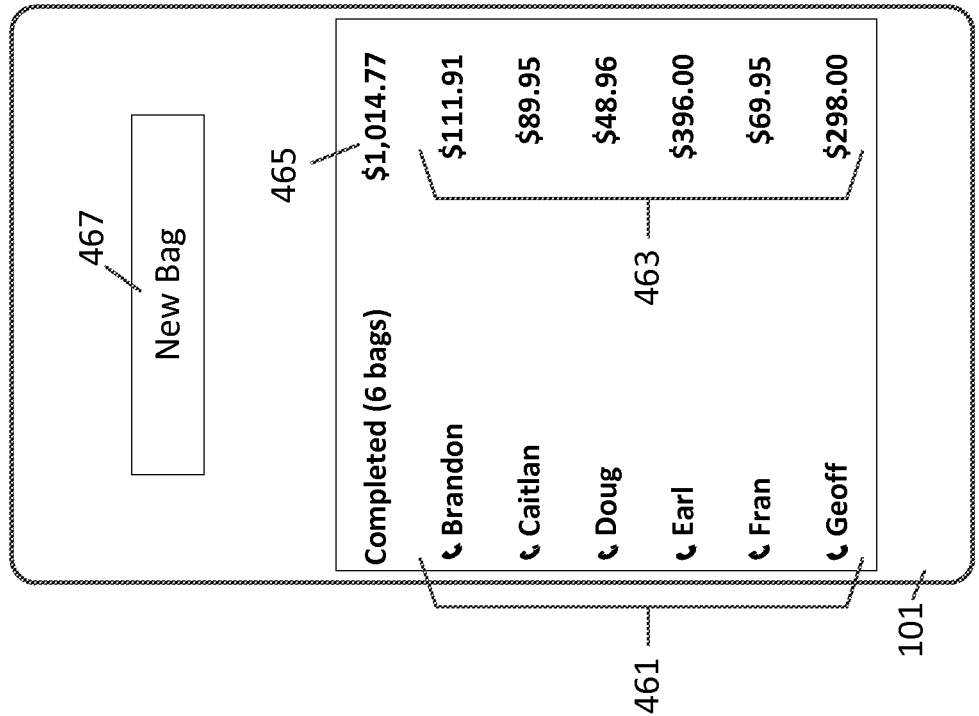
Figure 6:
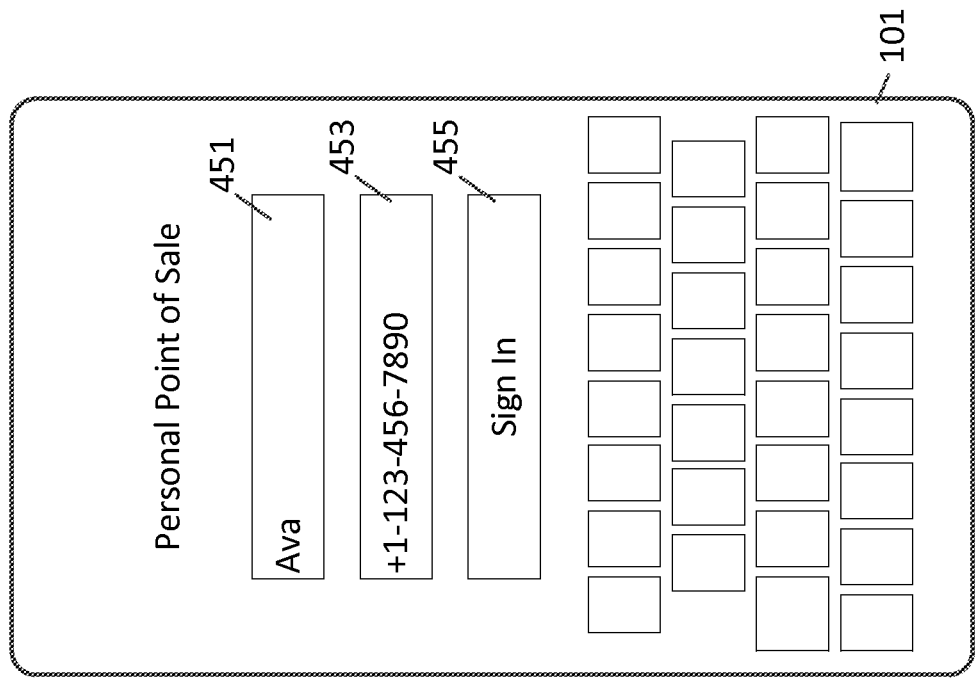

With reference to FIGS. 6-25, the inventive process can also be illustrated through screen shots of the mobile devices that can be used to complete a purchase transaction. In this example, the hypothetical merchant is ABC. The store's sales people can each uses mobile "Personal Point of Sales" (PPOS) programs running on mobile devices. When the sales person is assisting a buyer, the mobile device can be used to input sales data. With reference to FIG. 6, the sales person can sign into the PPOS program running on a mobile computing device 101 by inputting a name 451 and phone number 453 and then clicking the sign in button 455. With reference to FIG. 7, once the sales person has signed in, the PPOS can then display a summary of sales that have been made by the sales person. In this example, the PPOS displays each of the customers 461 that the sales person has assisted, the purchases 463 made by each customer 461 and the total sales volume 165. When the sales person helps a new customer, the "new bag" button 467 can be clicked.

Figure 9:
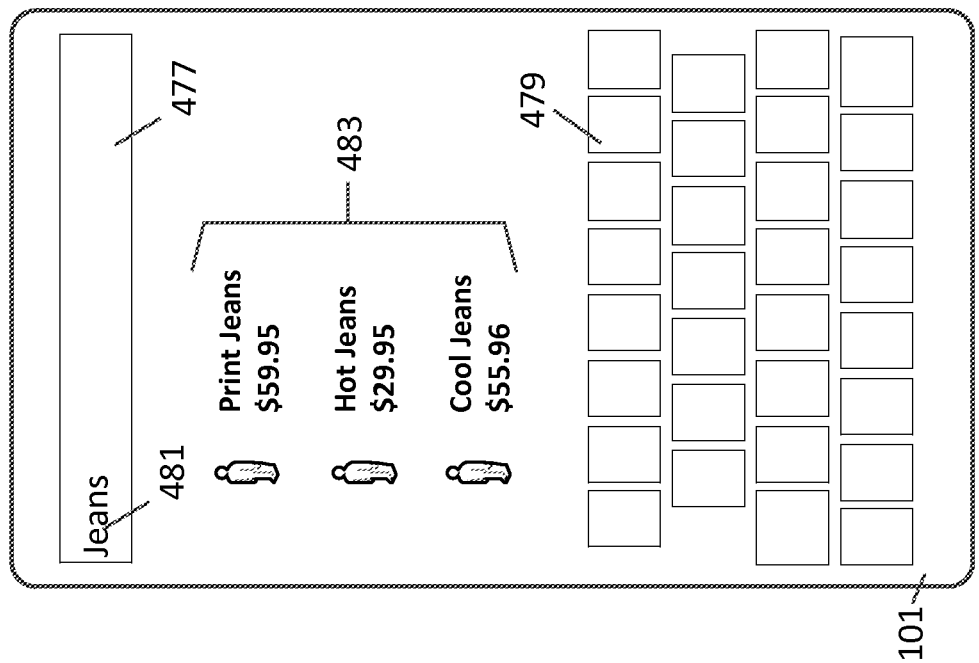
Figure 8:
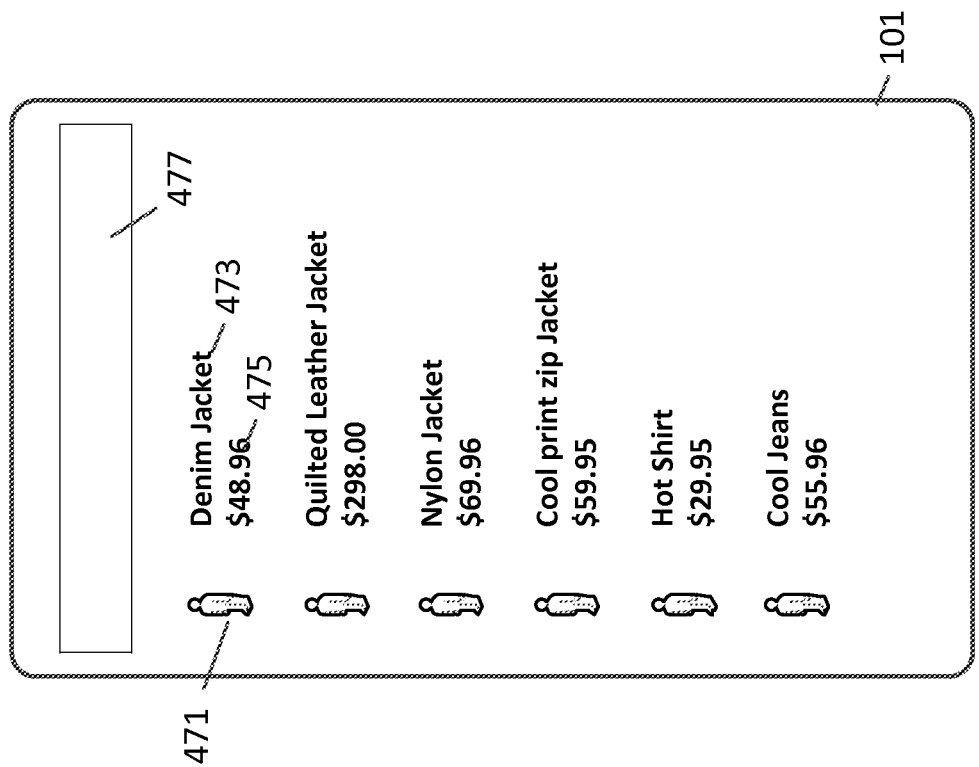

With reference to FIG. 8, the new bag button actuation will cause the PPOS device to display a set of goods that the new buyer may be interested in. This listing of possible goods of interest can be based upon current product popularity. In this embodiment, the PPOS displays a picture 471 of each of the clothing items, a description 473 of each of the items and the corresponding price 475. The PPOS also displays a search input are 477. With reference to FIG. 9, when the search input area 477 is actuated, the PPOS can display a keyboard 479. In this example, the buyer can ask for jeans and the sales person can input "Jeans" 481 in the search area 477 and the PPOS can search a database of products and display the items 483 that match the search term. The customer and sales person can go through the options and identify products that the customer may be interested in.

Figure 10:
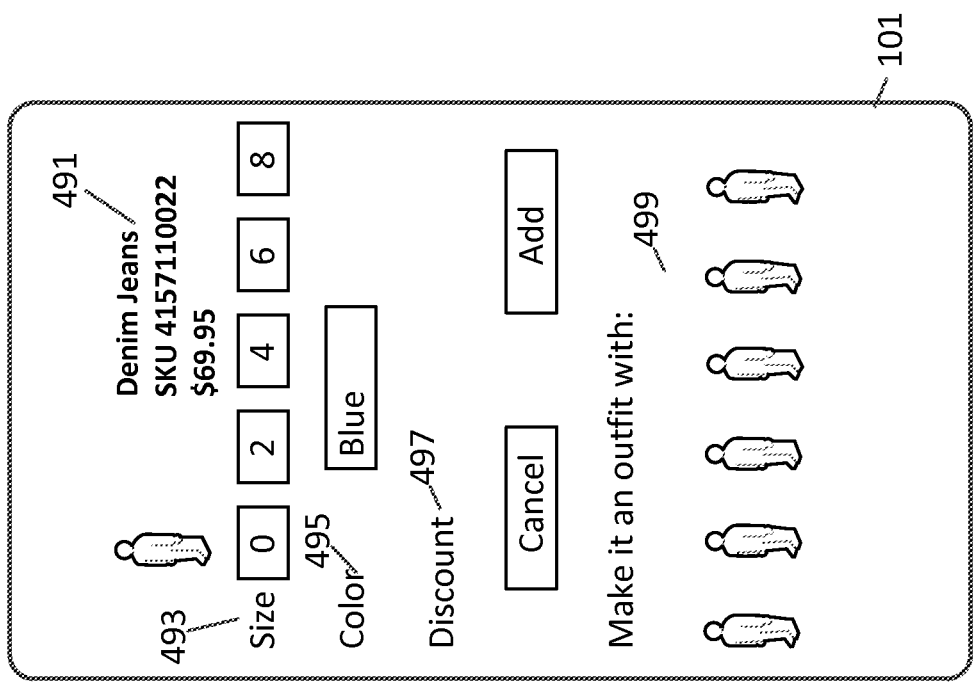

With reference to FIG. 10, when a specific product of interest is identified for the customer, the sales person can click on that item and the PPOS can display more information about the product 491 which can include a description, store keeping unit (SKU) number and price. In this example, the system can display the available sizes 493, colors 495, discounts 497 and recommended items 499 that may be complimentary to the selected item and might be of interest to the buyer. In an embodiment, the PPOS system can also interact with the ABC server to determine if the customer has made specific purchases in the past and what items the customer may have been looking at on the ABC website. Based upon this information, the system can determine the interests of the customer and make informed and relevant recommendations for other goods and/or services. This feature uses the on-line buying information to enhance the in store shopping experience.

Figure 11:
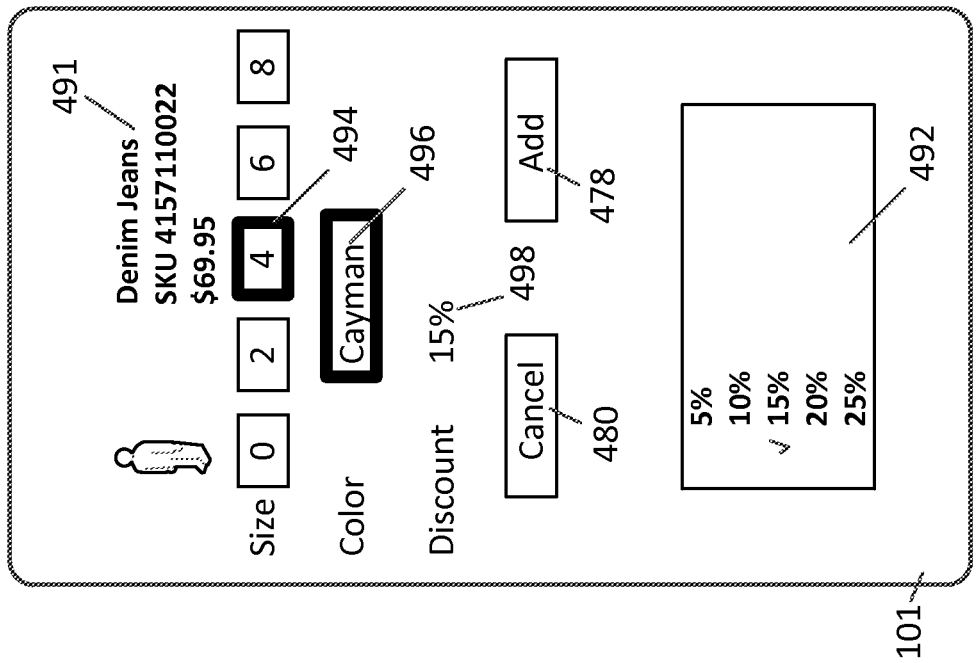

With reference to FIG. 11, the user can input the size, color and the sales person can input a percent discount, which can be applied for a sale, a promotion, customer loyalty program, etc. In this example, the Denim Jeans were selected in size 494, cayman color 496 with a 15% discount 498. In an embodiment, the sales person can select the % discount with a scroll wheel 492. The PPOS can check the inventory of the selected item at the store and other ABC stores. If the selected product is in stock, the PPOS can send a request to another store employee to bring the selected item out so the buyer can try the product on for size. Alternatively, if the item is not in stock the sales person can inform the buyer which ABC stores carry the product and can place the item on hold for the buyer. This feature of the PPOS allows the sales person to stay with the customer and provide immediate sales information. If the buyer decides to purchase the selected item, the sales person can then click the "add" button 478 to add the product is moved to the PPOS shopping bag or if the buyer is not interested in this product, the sales person can click on the cancel button 480.

Figure 15:
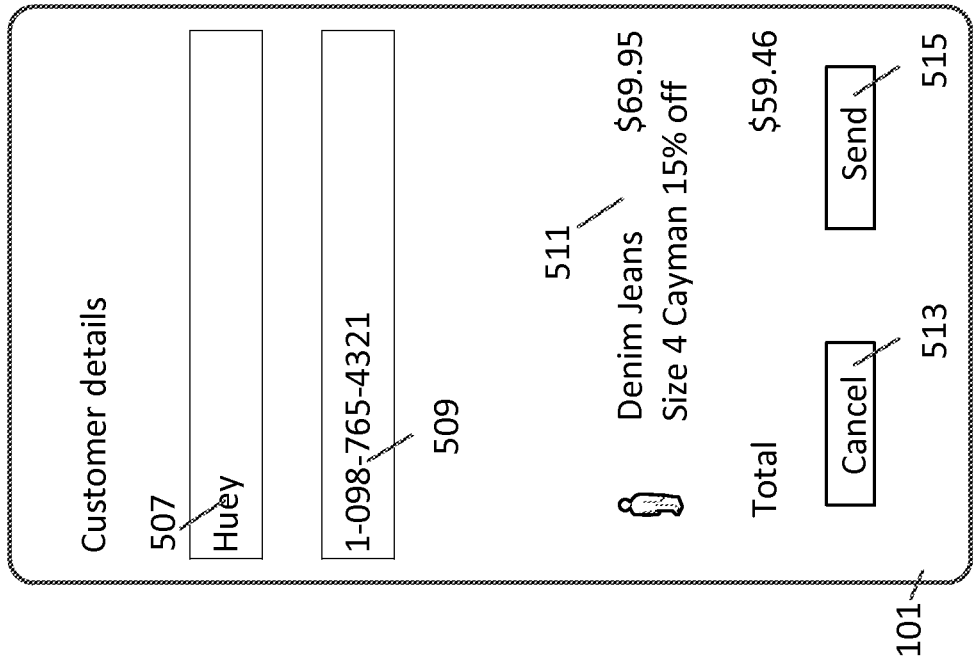
Figure 14:
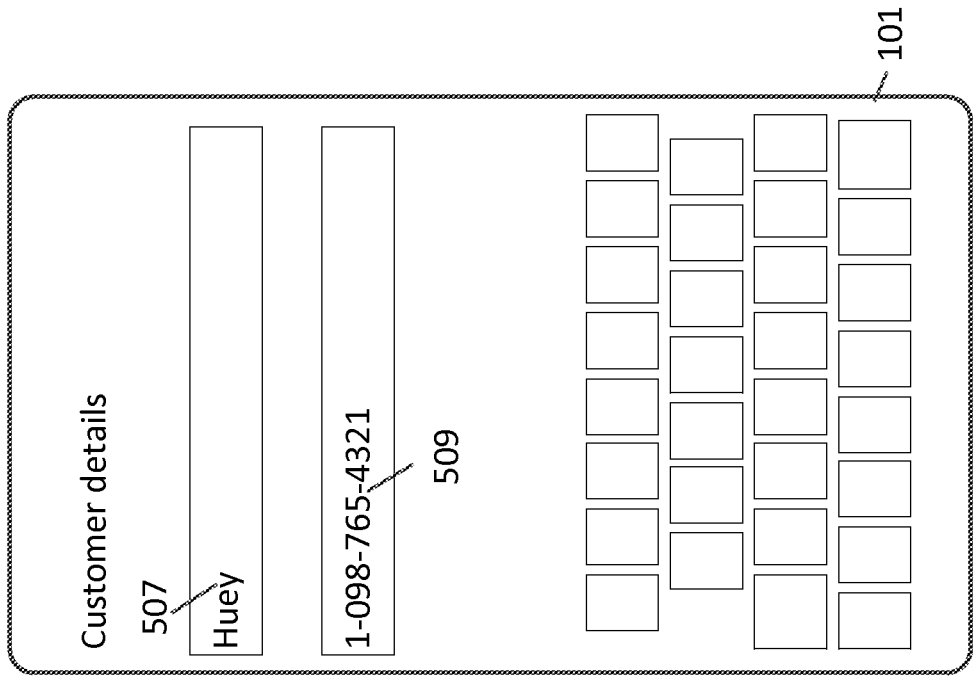

With reference to FIG. 12 if the item is selected for purchase, the PPOS displays a shopping bag icon with a "1" (501) to indicate the denim jeans and a price of $59.46 (503) which includes the 15% discount. Additional items can be added to the purchase using the process described above. When the buyer is finished purchasing goods, the sales person can click on the PPOS finish button 505. With reference to FIG. 13, when the finish button is actuated, the PPOS display can change to then input the buyer's personal information including name and phone number which can each have a name input area 507 and a phone number input area 509. With reference to FIG. 14, when the sales person clicks on the name input area 507 and/or phone number input area 509, the input keypad 479 can be displayed and the buyer's information can be input. In this example, the buyer's name 507 and phone number 509 are input. With reference to FIG. 15, after the buyer information input is input, the keyboard can be removed from the display. The buyer's name 507, phone number 509 and the purchase information 511 can be displayed. The purchase can be completed by clicking the send button 513 or cancelled by clicking on the cancel button 515.

Figure 16:
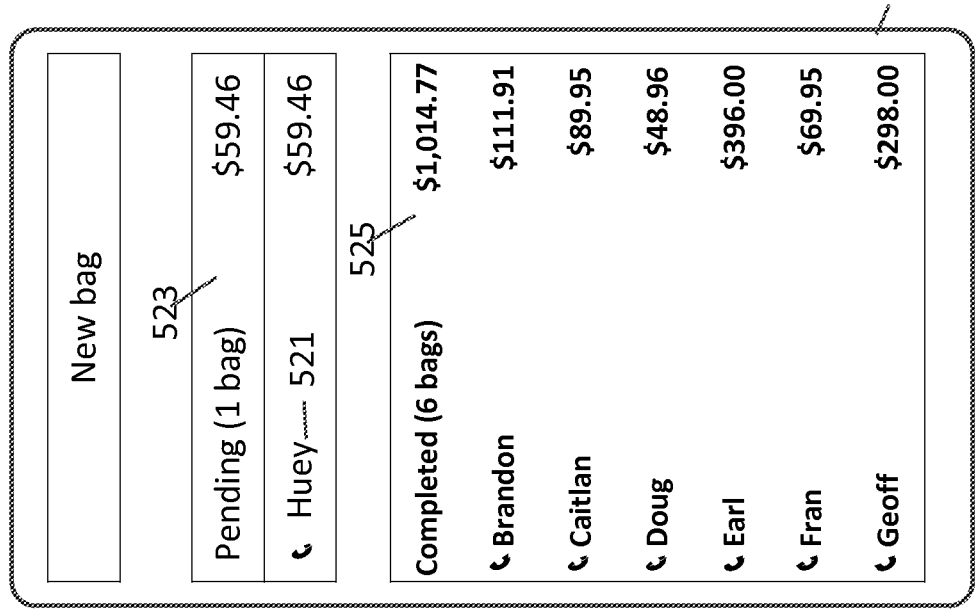

With reference to FIG. 16, once the send button is clicked, the PPOS can displays the buyer's name 521 in a pending transaction area 523. The PPOS can also display other customers' names with the corresponding prior completed transactions in a completed transaction area 525. At this point the sales person can thank the buyer and assist a new customer by repeating the disclosed process.

Figure 17:
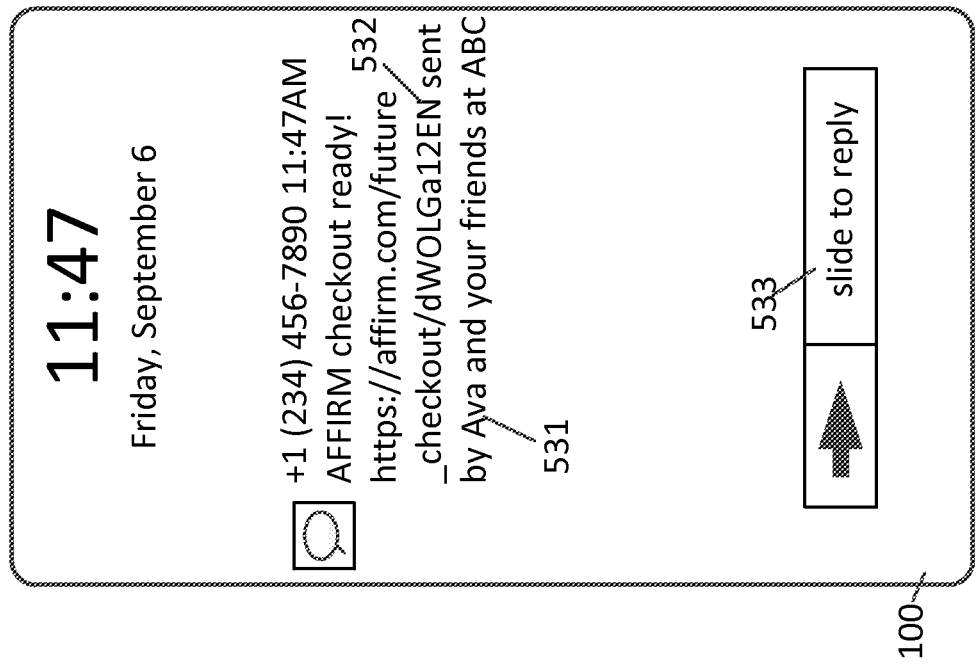
FIGS. 17-23 illustrate an embodiment of user interface of a purchasing program running on a smart phone used by a buyer.
Figure 18:
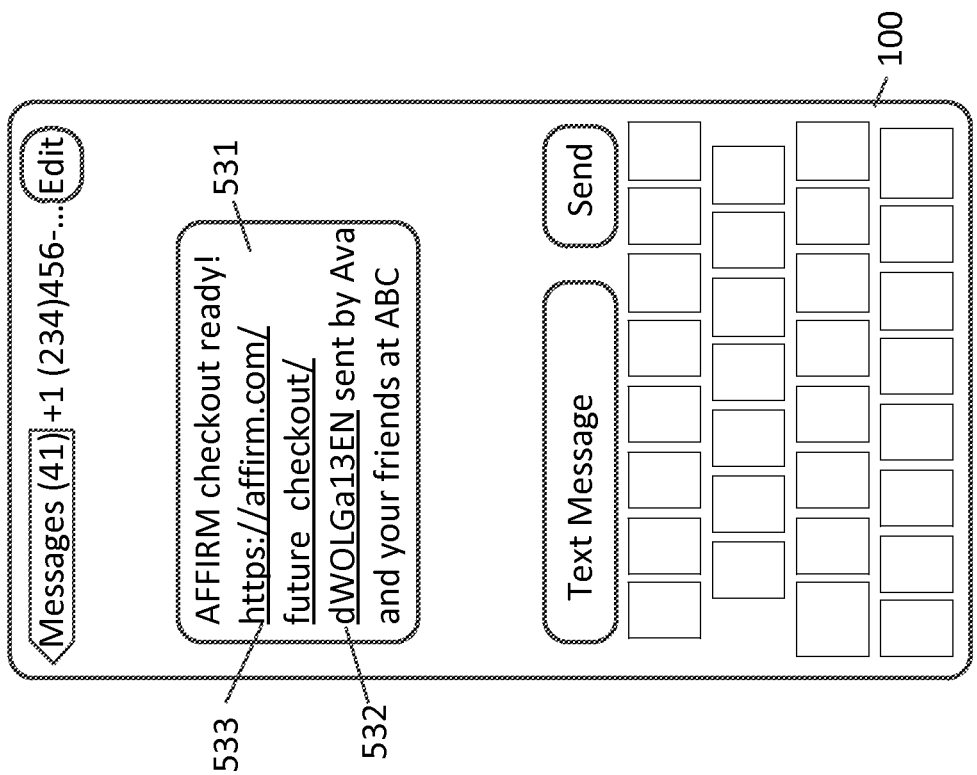

With reference to FIG. 17, once the purchase is initiated, a SMS message that includes a hyperlink and a randomly generated verification code is sent to the buyer's phone number and the SMS message can be displayed on the buyer's mobile device 100. The buyer can actuate the mobile device. The mobile device may be actuated by right swiping the arrow on a lower portion of the user interface. With reference to FIG. 18, once the mobile device is actuated, the buyer can respond to the text message by opening the SMS message and clicking on the hyperlink. In this embodiment, the randomly generated verification code is "dWOLGa13EN" 532 and the verification code is part of the hyperlink. The mobile device 100 can have a user interface switch 533 can be actuated to reply to the text message. With reference to FIG. 18, the mobile device 100 can display the SMS message 531 with the hyperlink 533 that includes the verification code 532. The mobile device 100 owner can click on the hyperlink 533 to continue the check out purchase.

Figure 19:
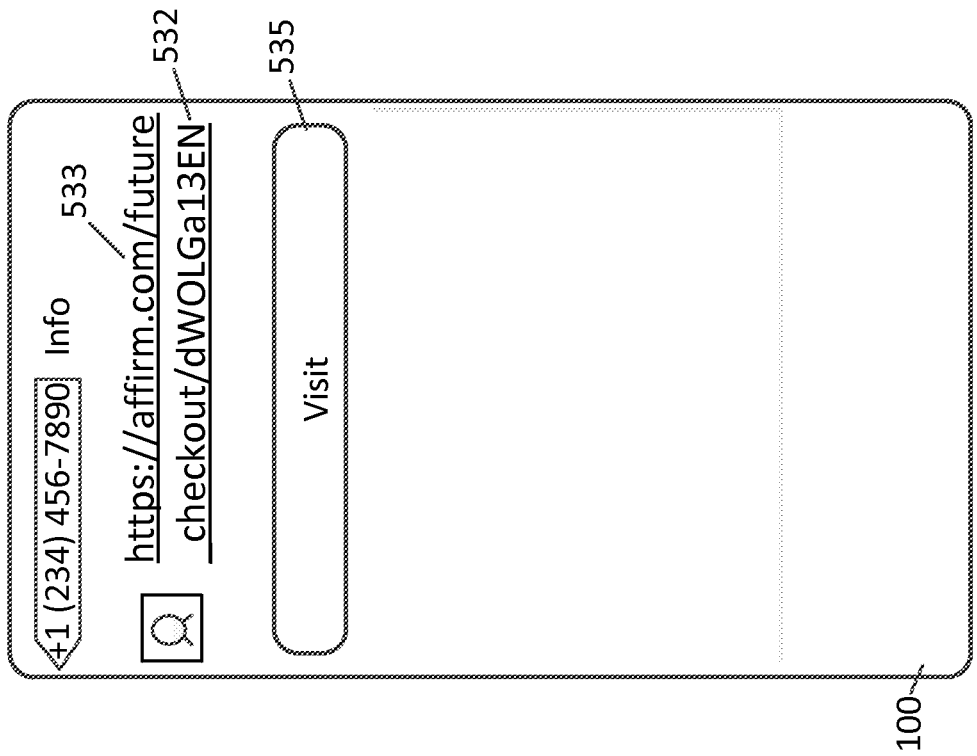

With reference to FIG. 19, clicking on the hyperlink causes the mobile device browser program to go to the server website which is displayed on the mobile device 100. Since the verification code 532 is part of the hyperlink and URL used by the web browser, the server will provide a purchase specific web page that matches the buyer's purchase. In this embodiment, the user can click on the "Visit" button 535 to go to the server website to complete the purchase. The mobile device browser can display the sales information for the purchase including the complete description of the item being purchased with size, color and discount as well as the address of the buyer. The buyer can have the option of receiving the goods at the store or having the item shipped to a buyer selected address. Rather than requiring the buyer to input this information, the PPOS system will display the last known address for the buyer or attempt to obtain the buyer's address from the buyer's input name and phone number.

Figure 21:
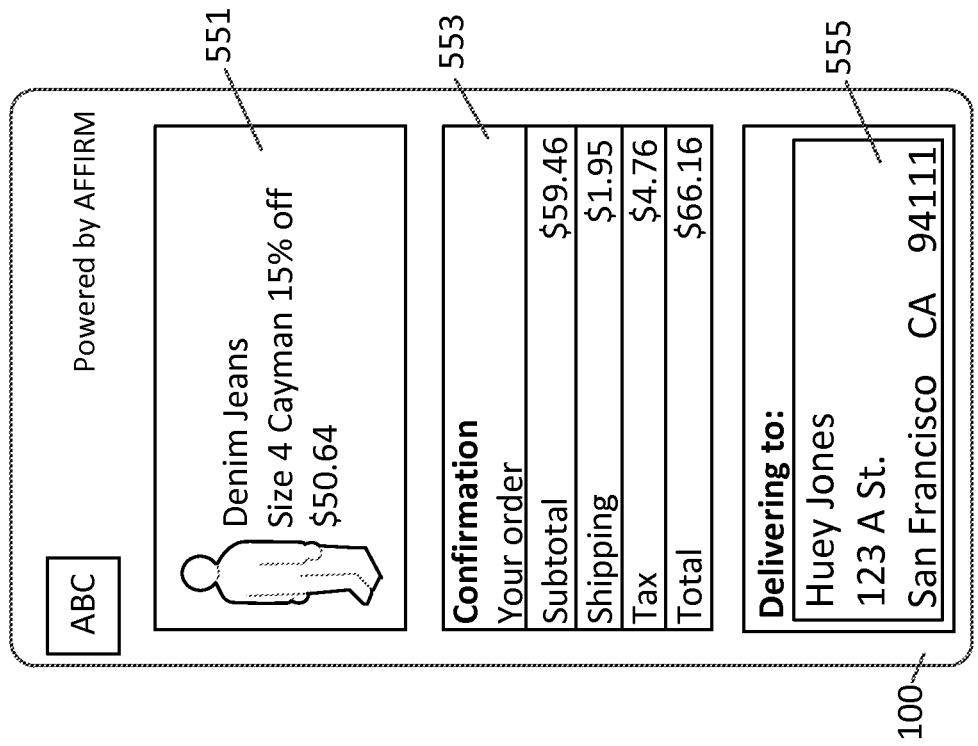
Figure 20:
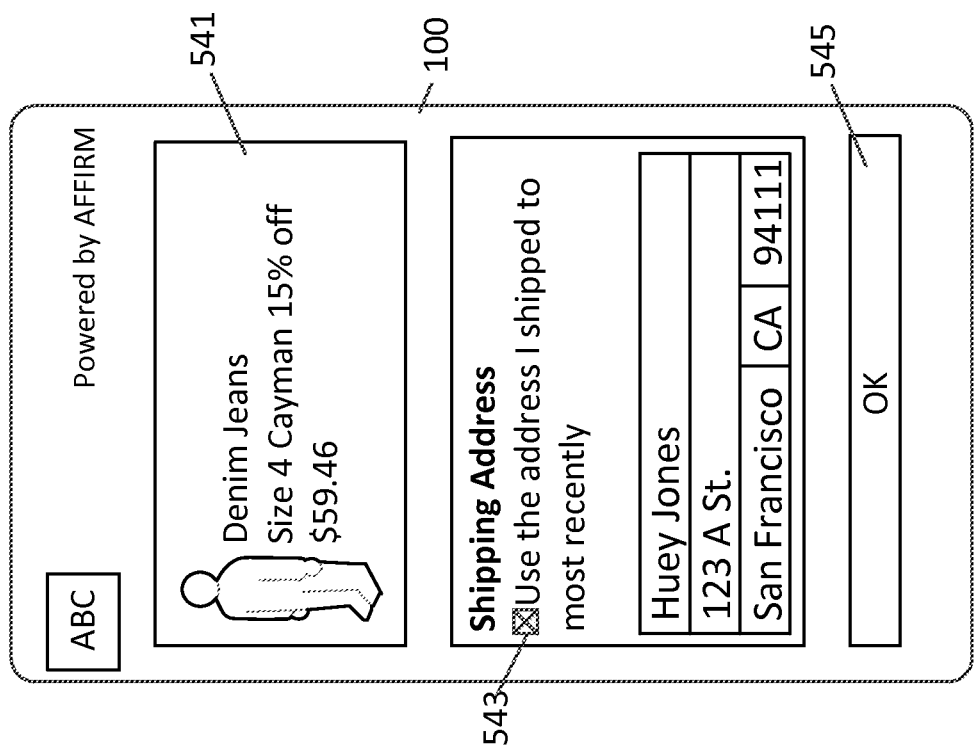

With reference to FIG. 20, the user clicked the Visit button and the browser on the mobile device 100 can display the sales information for the purchase including the complete description of the item being purchased which can include a photo, size, color and discount as well as the address of the buyer 541. The buyer can have the option of receiving the goods at the store or having the item shipped to a buyer selected address. Rather than requiring the buyer to input this information, the PPOS system will display the last known address for the buyer or attempt to obtain the buyer's address from the buyer's input name and phone number. If the address is found, the address information can be displayed for approval by the buyer. In this example, the user has clicked the button 543 to use the most recent shipping address on file which is displayed. In an embodiment, the PPOS system can also allow the user to edit the shipping address. In this example, the buyer has selected to have the item shipped to the most recently used address by the buyer. Once the buyer information is complete and accurate, the buyer can click the OK button 545. With reference to FIG. 21, the acceptance of the purchase can result in the system displaying a confirmation page which includes the purchase description 551, cost details 553 and shipping details 555.

Figure 23:
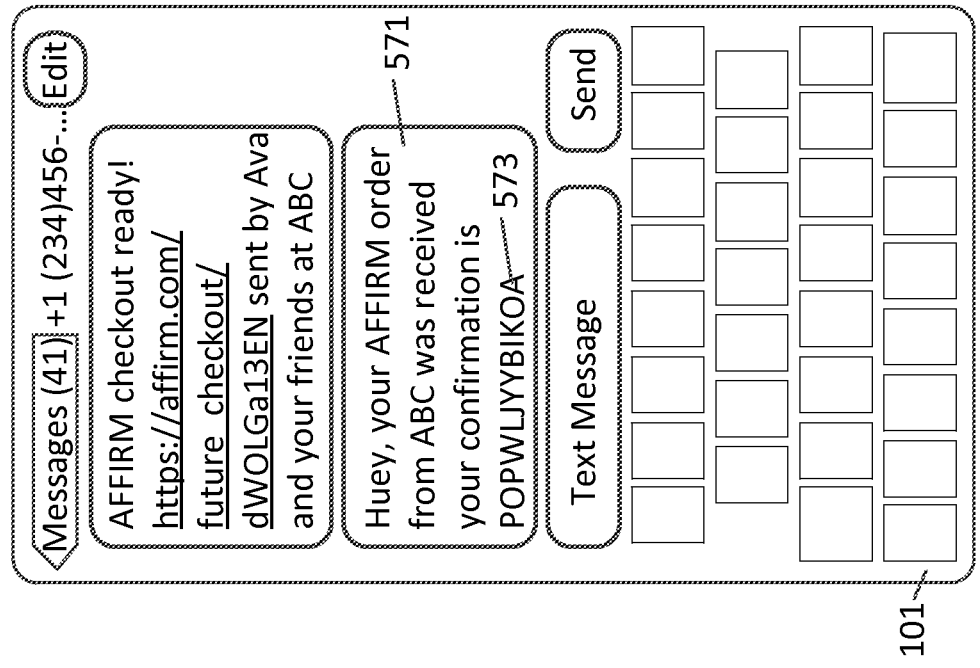
Figure 22:
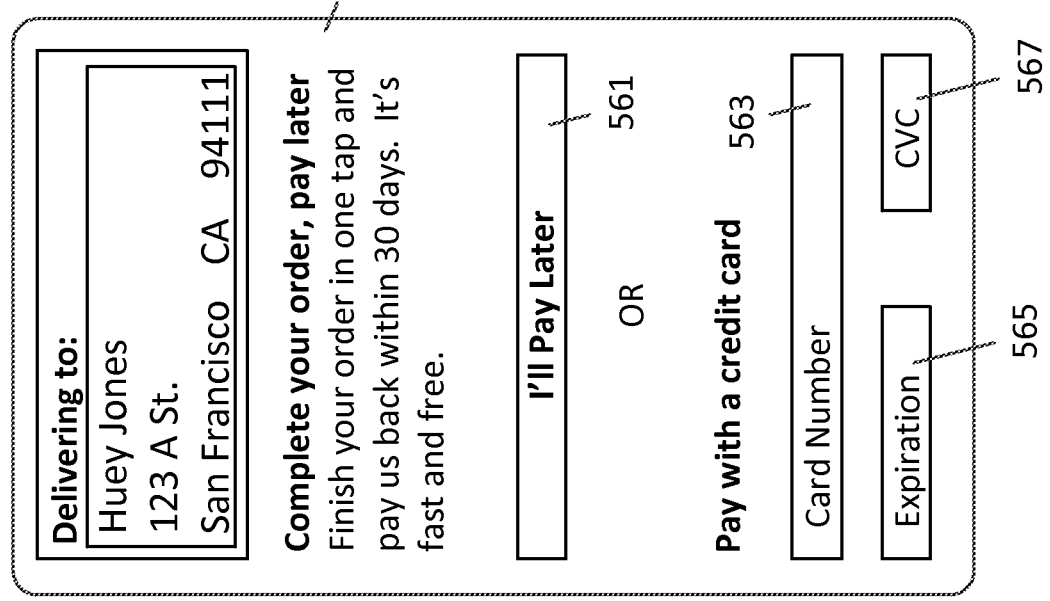

With reference to FIG. 22 in response to the order confirmation, the PPOS system can then give the buyer payment options which can include a later payment option and an immediate credit card payment option. The user can select the pay later option by clicking on the "I'll Pay Later" button 561. Alternatively, if the user wants to pay with a credit card, the user can input credit card information into a card number input area 563, an expiration date input area 565 and a card verification code CVC 567. With reference to FIG. 23 if the buyer elects to pay later, the PPOS system can transmit a confirmation SMS message 571 that can include a confirmation number 573 to the buyer's mobile device. The buyer will be billed at a later date for the described purchase. A confirmation SMS message will also be transmitted after the credit card purchase is completed.

Figure 25:
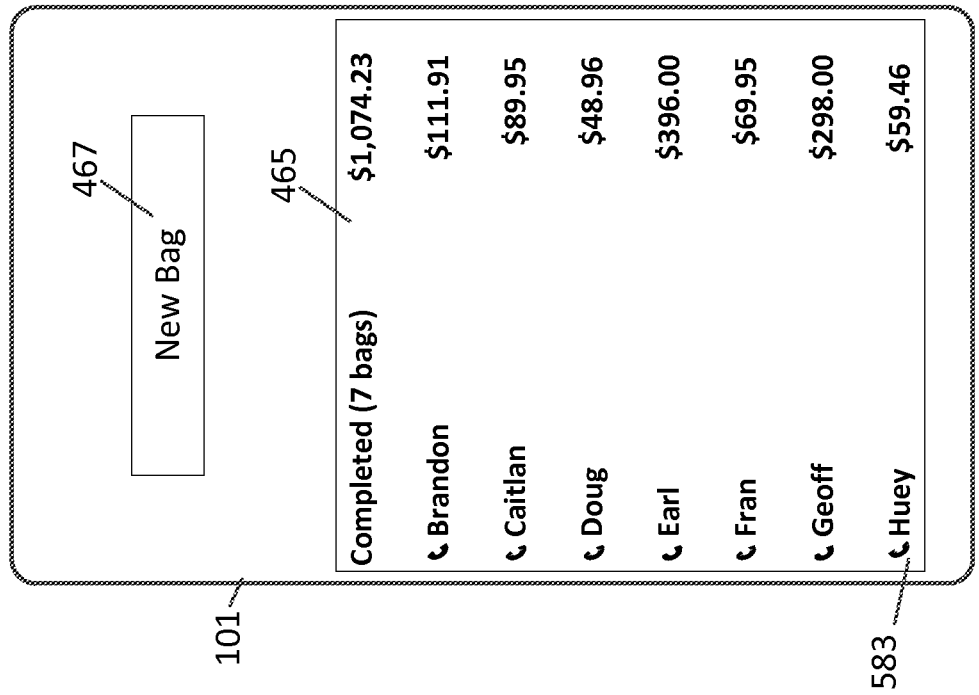
FIGS. 24-25 illustrate an embodiment of a user interface of a personal point of sale program running on a merchant computing device.
Figure 24:
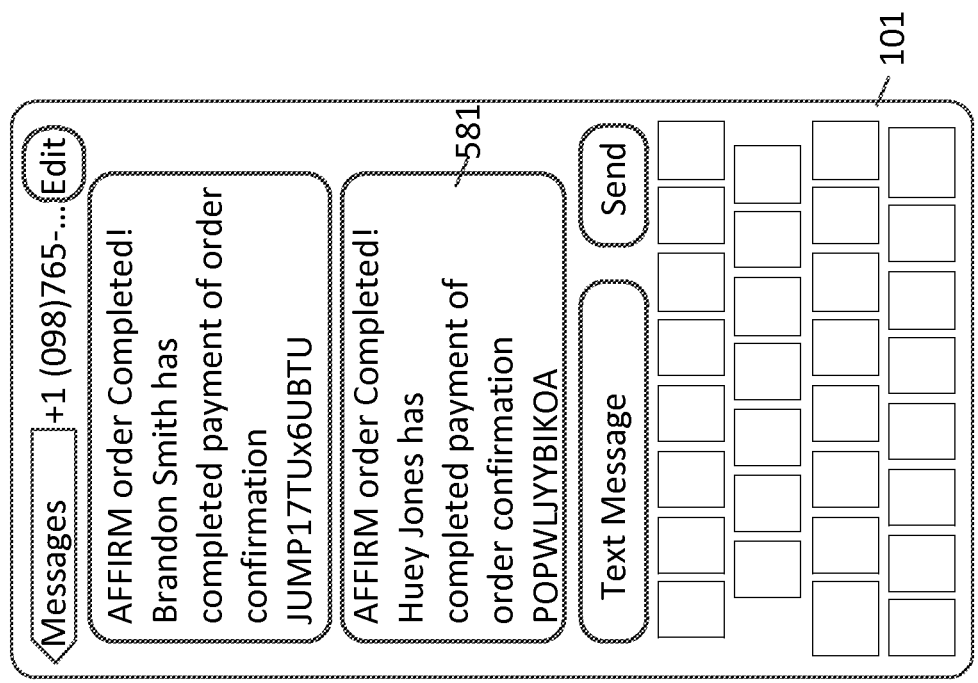

The sales person's mobile device can also receive the purchase information when purchases are made. With reference to FIG. 24, SMS messages have been sent to the sales person's mobile device for orders from Brandon Smith and Huey Jones. The PPOS system can display an order completion message 581 for the sales person who assisted the buyer. With reference to FIG. 25, the system can also update the pending and completed purchase screen when purchases are completed. In this example, the completed transaction 583 purchase by Huey has been moved from the "Pending" area to the "Completed" purchase area 465 of the user interface display.

Figure 26:
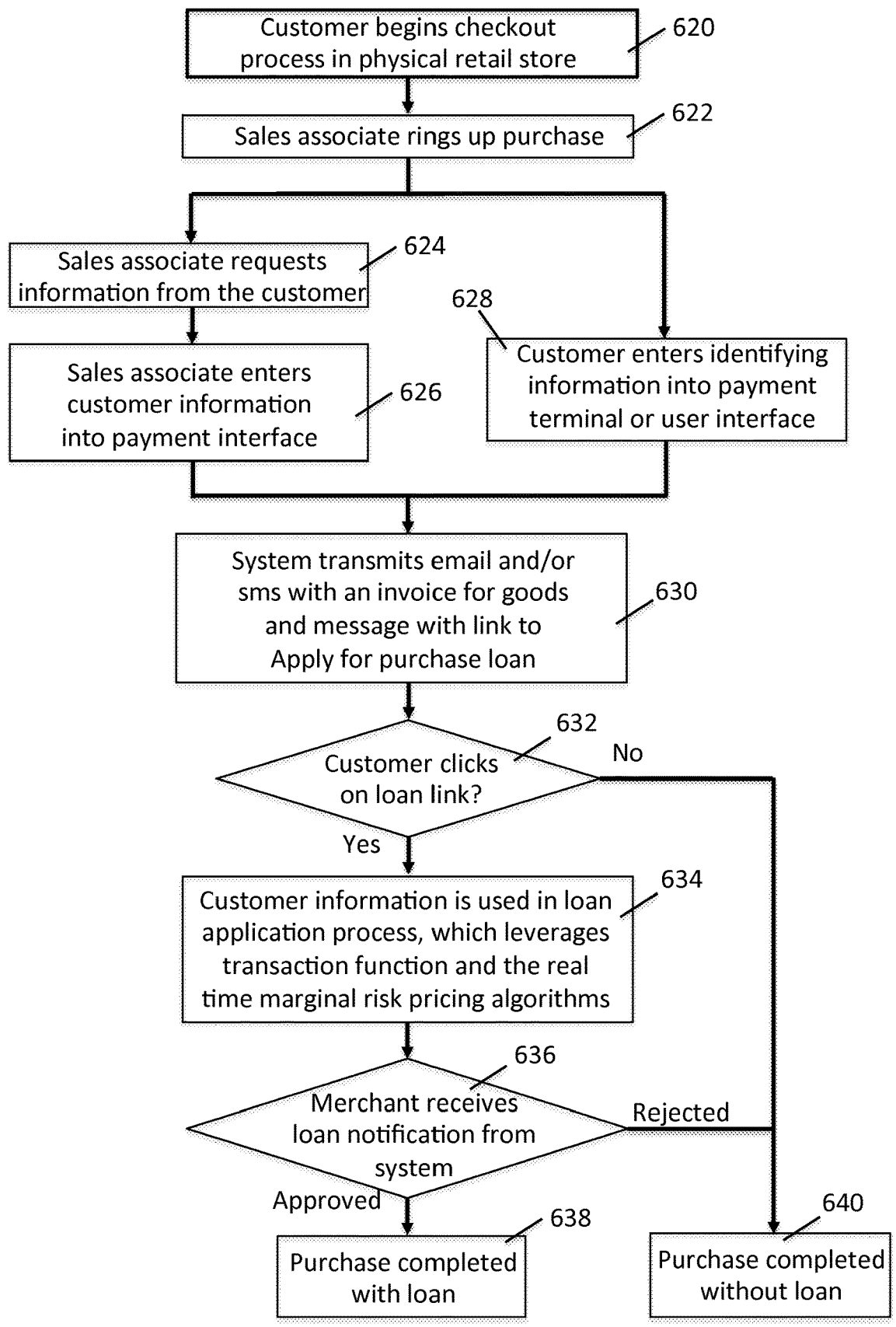
FIG. 26 illustrates a flow chart of an in store retail purchase process.
Figure 27:
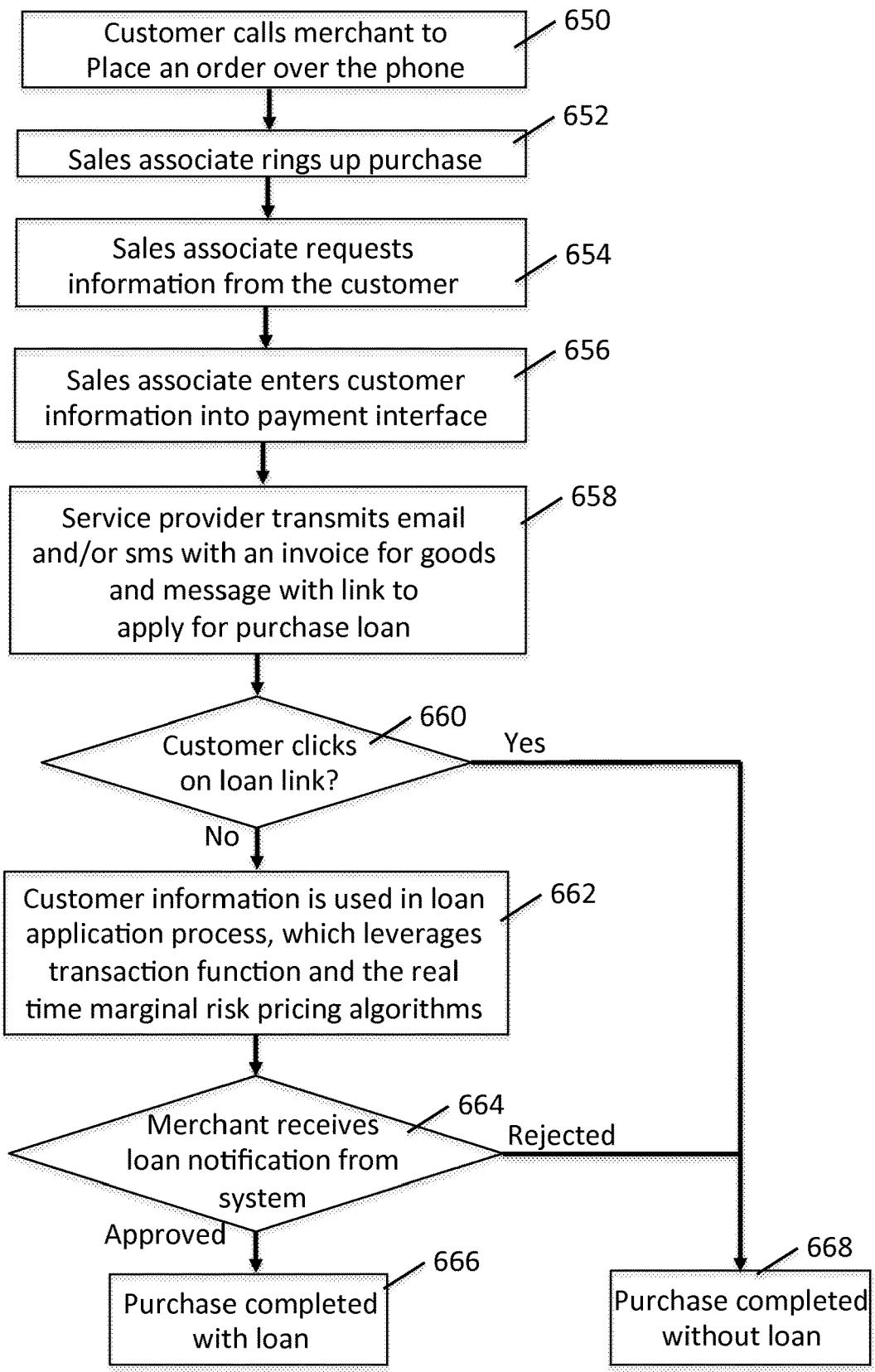
FIG. 27 illustrates a flow chart of a phone order purchase process.
Figure 28:
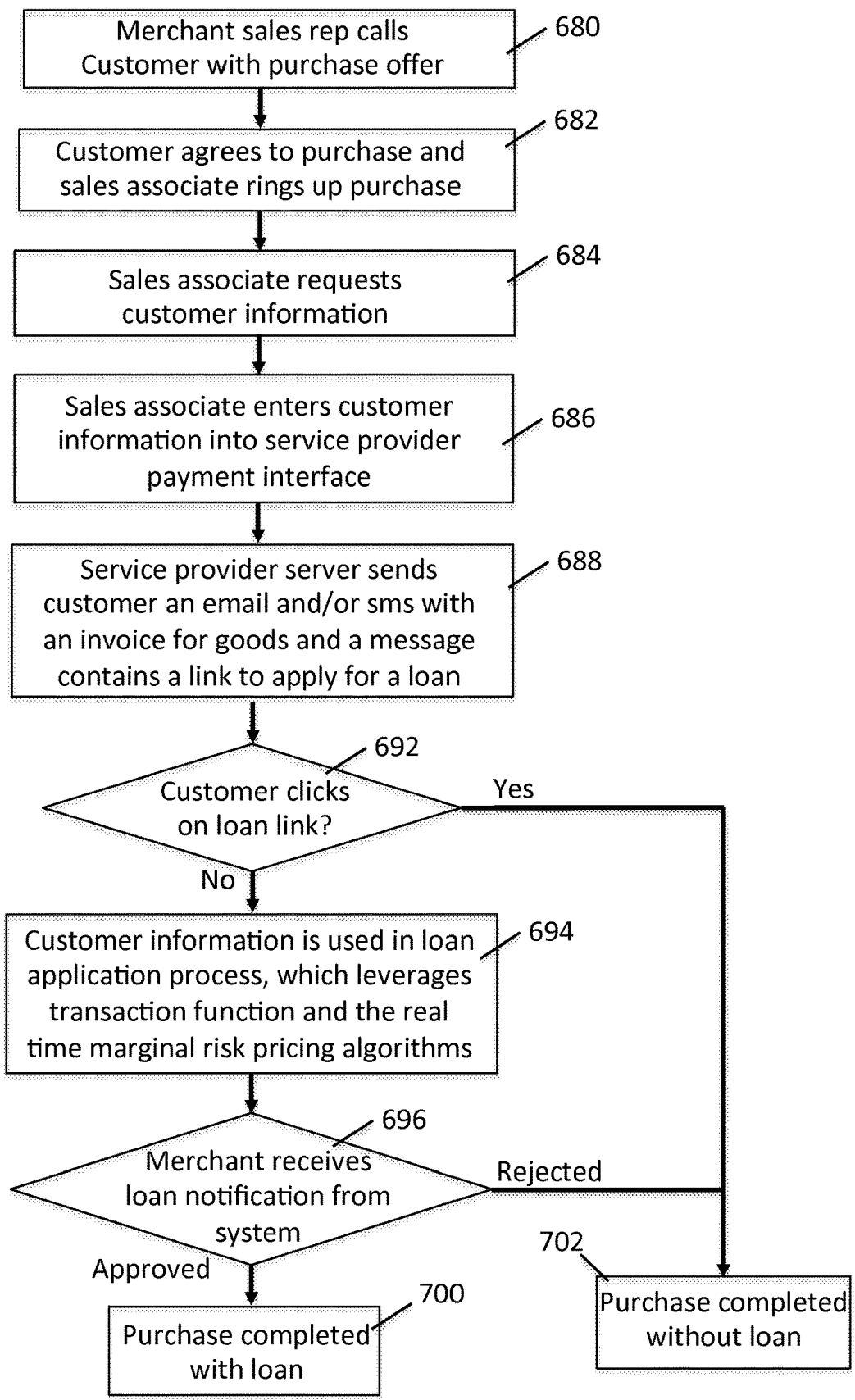
FIG. 28 illustrates a flow chart of a sale representative purchase process.
Figure 29:
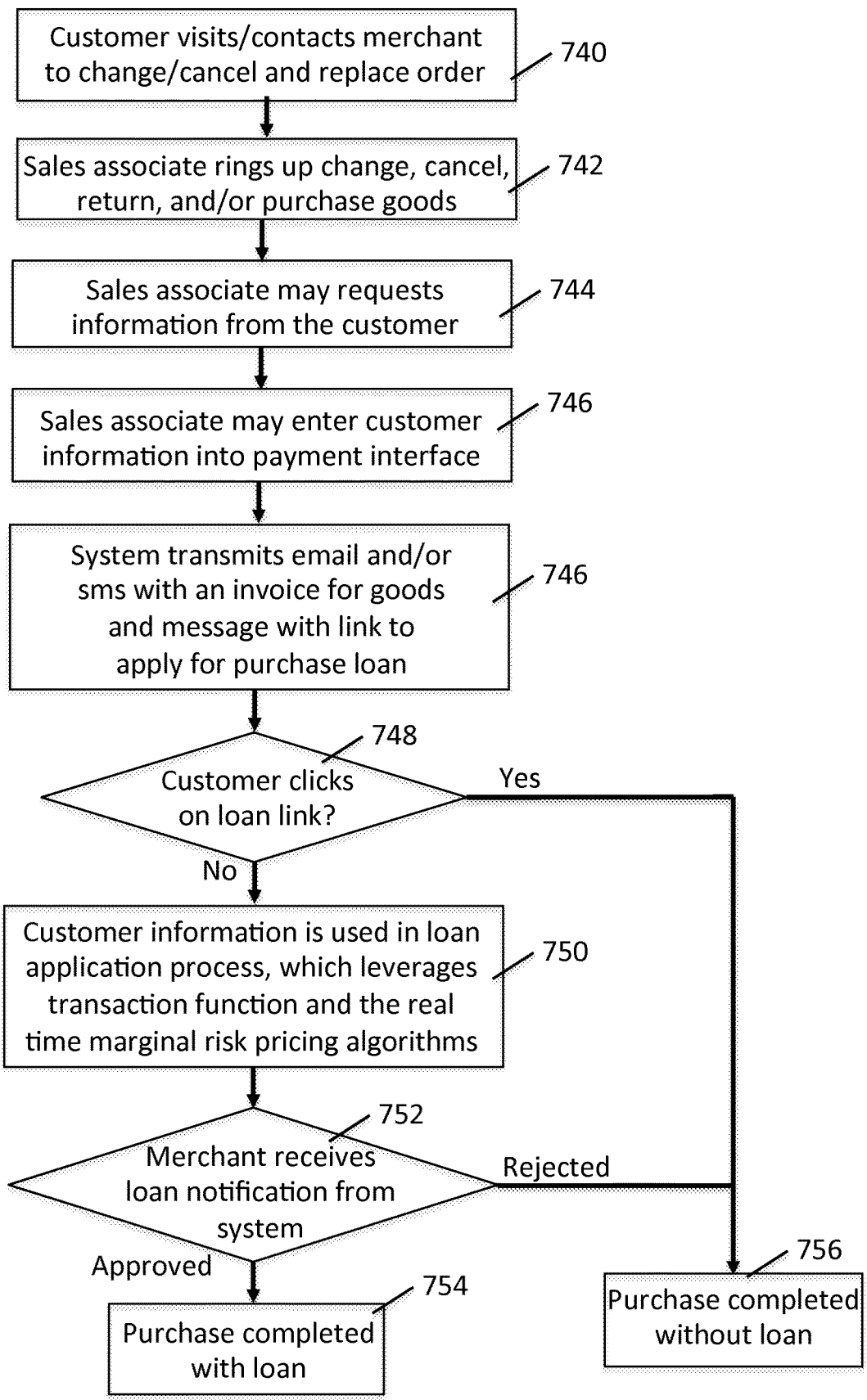
FIG. 29 illustrates a flow chart of a customer service process.

With reference to FIGS. 26-29, flowcharts are illustrated that can represent a number of different sales cases for merchants, including offline retail transactions, inside sales, inbound telephone sales, and customer support (both online and offline). FIG. 26 illustrates an example of an offline retail Point of Sale (POS). FIG. 27 illustrates an inbound telephone sales example. FIG. 28 illustrates an in inside sales example and FIG. 29 illustrates a customer service example.

An embodiment of the invention can be used in offline physical stores such as big box retailers. As shown in FIG. 26, a method includes the steps of a customer beginning a checkout process in a retail store 620. The customer can initiate the check out process in various ways. In an embodiment, a customer can bring items to be purchased to a checkout lane. In another embodiment, a customer can verbally recite or otherwise provide an order for goods or services to a sales representative. In yet another embodiment, a customer can select goods or services for purchase from an electronic menu screen, or a display on the customer's own personal mobile device.

Once the goods or services to be purchased are identified, a sales associate rings up a purchase 622. The purchase then can be processed by the sales associate or the buyer. Ringing up the purchase can also including collecting and/or allocating and/or scheduling the purchased goods and services to the customer, and informing the customer of the total purchase price. This can be performed by a computerized order management system.

The sales associate may request information from the customer 624. The customer can provide the requested information which the sales associate can enter into a payment interface 626. The customer information can be provided to the service provider and the customer account can be accessed. Alternatively, the customer can enter identifying information into a payment terminal or user interface 628 which can function to replace Steps 624 and 626. Using either method, the customer account can be associated with the purchase by the service provider server.

The service provider server can then transmit an invoice message for the goods or services purchased and the message can include a link to apply for a purchase loan 630. If the customer does not click on the loan link, the purchase can be completed without a loan 640. If the customer clicks on the loan link, the customer computing device browser is directed to a loan application website 634. The system processes the customer information in the loan application process and leverages a transaction function and real time marginal risk pricing algorithms to determine if a loan will be issued to the customer and the terms of the loan 634. The loan application process includes processing customer information by the service provider server. The application process can use identifying information about the customer, the items being purchased (e.g. the credit risk level of a purchase of eggs is different than the credit risk level of gold jewelry), and other information that can be computed using a transaction function as described in U.S. Provisional Patent Application No. 61/917,156, "System And Method Of Transacting" which is incorporated herein by reference in its entirety.

The service provider server can transmit a loan acceptance/rejection notification to the merchant server 636. If the loan is approved, the terms of the loan can be approved by the customer before the purchase is completed by the merchant server with the loan for the purchase provided by the service provider server 638. If the loan is rejected, the purchase can be completed by the merchant without a loan 640 from the service provider. The merchant can either halt the transaction, or the merchant can ask for an alternative payment method, such as: cash, credit, check, bank account number, PAYPAL, etc.

An embodiment of the invention can be used to handle inbound telephone sales calls which can allow a user to begin a checkout process with a live sales representative over the phone. This step can include a customer ordering directly with a sales person on the other end of the telephone line, verbally placing the order. Alternatively this step could be performed over a chat service or a messaging service. A typical example of this would be a customer calling in to purchase a product or service out of a catalog, from a TV advertisement, through a merchant sales phone number, in response to a promotion (received by mail, email, or via a website), etc.

As shown in FIG. 27, a purchasing method can include the steps: a customer calling a merchant to place an order over the phone 650, a sales associate ring up a purchase 652, a sales associate can request information from the customer 654, the sales associate can enter the customer information into a payment interface 656. Alternatively, the customer information may already be stored in the merchant server database and steps 654 and 656 may not be necessary. The customer can receive an invoice message for the goods or services purchased and the invoice includes a link to apply for a loan 658. If the customer clicks on the loan link, the customer's computing device can be launched into the application process web page and the service provider server can process the customer information in the loan application and leverage a transaction function and real time marginal risk pricing algorithms to determine if a loan will be issued to the customer and the terms of the loan 662. The service provider server can decide to offer or decline the loan and the merchant receives a notification that the loan is either approved or denied 664. If the loan is approved by and for the customer, the merchant can complete the transaction accepting the loan for payment 666. If the loan is rejected, the merchant can complete the purchase transaction without the loan 668. The merchant can either halt the transaction, or the merchant can ask for an alternative payment method, such as: cash, credit, check, bank account number, PAYPAL, etc. In an embodiment, the invention can be used to handle inside sales calls and offers to generate more sales from existing customers. As shown in FIG. 28, a method includes the steps of a merchant sales representative calling a customer with a sales offer 680. This step can include a merchant sales representative calling customers who may have previously expressed an interest in a product to present them with a discount. A merchant can contact a user to offer them an upsell to another product, or a product that may be a better fit, or a better value. Alternatively, the contact can be performed via a chat service, a messaging service, email, or other methods of contact. The customer can agree to the purchase and the sales associate ringing up the purchase 682. The sales associate can request customer information 684. The sales associate can enter the customer information into a payment interface 686. In some cases, a merchant may already have the customer information and the identification information may have been entered into a payment interface or an order database. Thus, steps 684 and 686 may not be necessary.

The service provider can transmit an email an/or sms with an invoice for the goods or services purchased with a message containing a link to apply for a purchase loan 688. The system can detect if the customer clicks on the loan link 692. If the loan link is not clicked, the purchase can be completed without the loan 702. If the loan link is clicked, the system can perform loan application processing that includes analyzing the customer information as described above 692. The merchant receives a notification from the POS system that the loan is either approved or denied 696. If the loan is approved, the merchant can complete the transaction 700. If the loan is rejected, the merchant can either halt the transaction, or the merchant can complete the purchase without a loan 702. The customer may use an alternative payment method, such as: cash, credit, check, bank account number, PAYPAL, etc.

An embodiment the invention can be used to improve the customer service experience of both customers and merchants and reduce transactional friction for both customers and merchants. When customers can just click a link sent to them via a mobile device or an email to initiate and/or complete a return or an order modification, the customer experience is dramatically improved, and can be a very beneficial for a merchant seeking repeat customers. As shown in FIG. 29, a method for customer service processing includes the steps of a customer contacting a merchant to cancel and replace an order 740. The customer can contact a merchant to cancel and replace an order. The described system can allow both a customer and a merchant more convenience to modify an existing order or to cancel an order or allow a customer to easily return a product to a merchant for a full or partial refund. For example, there may be a problem with a product or a service that was recently purchased, the customer can contact the merchant and request a full refund of the product or service, or a partial refund for an unused portion of a product or service (e.g. a pro-rated refund), or any other type of refund. In another example, a customer can contact a merchant or a service provider with a request to reschedule delivery of a product or reschedule a service to be provided. In yet another example, a customer can contact a merchant to change an order if a mistake was made (e.g. a wrong size or color or product or service was ordered). In yet another example, a customer can contact a merchant to cancel an existing order and replace the order with another order. Alternatively, the contact can be performed via a chat service, a messaging service, email, or other methods of contact.

During a return or an order modification, when the error is explained, a sales associate rings up a cancel and/or return and/or revised purchase 742. The sales associate can then request information from the customer 744 and the sales associate can enter the customer information into a payment interface 746. In some cases, a customer service representative may already have the customer information and may have already entered the identification information into a payment interface or an order database. Thus, steps 744 and 746 may not be necessary.

The system can process the customer request and transmit an invoice message for the corrected goods or services purchased. If additional money is required to pay for the corrected goods or services, the invoice can include a link to apply for a loan. The customer can then decide whether or not to apply for the loan 748. If the customer is not interested in the loan, the transaction can be completed without a loan. Alternatively, if the customer clicks on the loan link, the, customer's web browser is directed to an application process, and the user information is analyzed to determine if the loan is approved by the system 750. The merchant receives a notification from the POS system that the loan is either approved or denied 752. If the loan is rejected, the purchase can be completed without the loan 756. If the loan is approved and accepted, the purchase can be completed by the merchant with the loan 754.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. As a person skilled in the art will recognize from the previous detailed description and from the figures, modifications and changes can be made to the preferred embodiments of the invention without departing from the scope of this invention.

What is claimed is:

1. A method for purchasing goods comprising:
providing a server, a database and a smart phone in communication with the server through a network;
receiving by the smart phone only a user name and a phone number for the smart phone provided by a user, wherein a password is not used;
transmitting from the smart phone to the server, the user name, the phone number for the smart phone associated with the user name and identification information for the smart phone during a registration of the user;
storing by the server, the user name, the phone number and the identification information for the smart phone on the database;
recognizing by the server, the user name, the phone number and the identification information for the smart phone to authenticate the user during a passwordless login of the user;
inputting the goods in a personal point of sales program running on a mobile computing device;
transmitting by the server, a verification message that includes a unique randomly generated verification code that is part of a hyperlink for purchasing the goods to the phone number of the smart phone during the passwordless login of the user after the goods have been input in the personal point of sales program;
displaying a webpage for the hyperlink for purchasing the goods on the smart phone of the user during the passwordless login of the user;
receiving by the server, a purchase acceptance response to the verification message transmitted through the hyperlink for accepting the purchasing the goods from the smart phone to authenticate the user during the passwordless login of the user;
binding by the server, identification information for the smart phone to the user during the passwordless login of the user; and
authorizing by the server, the user and the smart phone to interact with the server using the passwordless login to complete the purchase of the goods during the passwordless login of the user.

2. The method of claim 1, wherein the purchase of the goods includes a loan to the user for purchasing the goods.

3. The method of claim 1, wherein the verification message includes a push notification sent to the smartphone, and where in the push notification interacts with an app installed on the smart phone.

4. The method of claim 1, wherein the verification message includes a phone call made to the phone that plays an audio signal of a verification code.

5. The method of claim 1, wherein the verification message is a short message service (SMS).

6. The method of claim 1 wherein the unique randomly generated verification code is at least five alphanumeric characters long.

7. The method of claim 1 wherein the hyperlink includes the verification code that is a randomly generated sequence of characters that is at least five characters long.

8. The method of claim 1 wherein the verification code includes at least one upper case letter and at least one lower case letter.

9. The method of claim 1 wherein the receiving step is within a predetermined time from the transmitting step.

10. The method of claim 1 further comprising:
canceling by the server, the authorization of the user and the smart phone to interact with the server using the passwordless login when the receiving step is after the predetermined time from the transmitting step.

11. The method of claim 1 further comprising:
canceling by the server, the authorization of the user and the smart phone to interact with the server using the passwordless login when the phone number for the smart phone is no longer associated with the user.

12. A method for obtaining a loan for purchasing goods comprising:
providing a server, a database and a smart phone in communication with the server through a network;
receiving by the smart phone only a user name and a phone number for the smart phone provided by a user, wherein a password is not used;

transmitting from the smart phone to the server, the user name, the phone number for the smart phone associated with the user and identification information for the smart phone during a registration of a user;

storing by the server, the user name, the phone number and the identification information for the smart phone on the database;

recognizing by the server, the user name, the phone number and the identification information for the smart phone to authenticate the user during a passwordless login of the user;

inputting the goods in a personal point of sales program running on a mobile computing device;

transmitting by the server, a verification message that includes a hyperlink and a unique randomly generated verification code that is part of the hyperlink for the loan for purchasing the goods to the phone number of the mobile device during the passwordless login of the user after the goods have been input in the personal point of sales program;

displaying a webpage for the hyperlink for the loan for purchasing the goods on the smart phone of the user during the passwordless login of the user;

receiving by the server, a purchase acceptance response to the verification message transmitted through the hyperlink for accepting the loan for purchasing the goods from the mobile device to authenticate the user during the passwordless login of the user;

binding by the server, identification information for the mobile device to the user during the passwordless login of the user; and authorizing by the server, the user and the mobile device to interact with the server using the passwordless login to complete the loan for the purchase of the goods.

13. The method of claim 12 wherein the unique randomly generated verification code is at least five alphanumeric characters long.

14. The method of claim 12 wherein the verification message is a short message service (SMS).

15. The method of claim 12 wherein the unique randomly generated verification code includes at least one upper case letter and at least one lower case letter.

16. The method of claim 12 wherein the receiving step is within a predetermined time from the transmitting step.

17. The method of claim 12 further comprising:
canceling by the server, the authorization of the user and the mobile device to interact with the server using the passwordless login when the receiving step is after the predetermined time from the transmitting step.

18. The method of claim 12 further comprising:
canceling by the server, the authorization of the user and the mobile device to interact with the server using the passwordless login when the phone number for the mobile device is no longer associated with the user.

19. A method for purchasing goods comprising:
providing a server, a database and a mobile device in communication with the server through a network;

receiving by the mobile device only a user name and a phone number for the mobile device from a user, wherein a password is not used;

transmitting from the mobile device to the server, the user name, the phone number for the mobile device and the unique identifier for the mobile device associated with the user during a registration of the user;

storing by the server, the user name, the phone number and the unique identifier on the database;

recognizing by the server, the user name, the phone number and the unique identifier for the mobile device to authenticate the user during a passwordless login of the user;

inputting the goods in a personal point of sales program running on a mobile computing device;

transmitting by the server, a verification message that includes a hyperlink and a unique randomly generated verification code that is part of the hyperlink for purchasing the goods using the unique identifier to the mobile device during the passwordless login of the user after the goods have been input in the personal point of sales program;

displaying a webpage for the hyperlink for purchasing the goods on the mobile device of the user during the passwordless login of the user;

receiving by the server, a purchase acceptance response to the verification message transmitted through the hyperlink for accepting the purchasing the goods from the mobile device to authenticate the user during the passwordless login of the user;

binding by the server, identification information for the mobile device to the user; and authorizing by the server, the user and the mobile device to interact with the server using the passwordless login to complete the purchase of the goods during the passwordless login of the user.

20. The method of claim 19 wherein the verification code is a randomly generated sequence of characters that is at least five characters long.

21. The method of claim 19 wherein the hyperlink includes the unique randomly generated verification code that is at least five alphanumeric characters long.

22. The method of claim 19 wherein the unique randomly generated verification code includes at least one upper case letter and at least one lower case letter.

23. The method of claim 19 wherein the receiving step is within a predetermined time from the transmitting step.

24. The method of claim 19 further comprising:
canceling by the server, the authorization of the user and the mobile device to interact with the server using the passwordless login when the receiving step is after the predetermined time from the transmitting step.

25. The method of claim 19 further comprising:
canceling by the server, the authorization of the user and the mobile device to interact with the server using the passwordless login when the unique identifier for the mobile device is no longer associated with the user.

* * * * *